US012715342B2

(12) United States Patent
Lan et al.

(10) Patent No.: US 12,715,342 B2
(45) Date of Patent: Aug. 25, 2026

(54) SEAT TILT ADJUSTMENT MECHANISM AND ZERO-GRAVITY VEHICLE SEAT

(71) Applicant: YANFENG INTERNATIONAL AUTOMOTIVE TECHNOLOGY CO., LTD., Shanghai (CN)

(72) Inventors: Shunqiang Lan, Shanghai (CN); Yueyun Chen, Shanghai (CN); Wu Zhang, Shanghai (CN); Xiaohan Jiang, Shanghai (CN); Tingyong Cai, Shanghai (CN)

(73) Assignee: YANFENG INTERNATIONAL AUTOMOTIVE TECHNOLOGY CO., LTD., Shanghai (CN)

( * ) Notice: Subject to any disclaimer, the term of this patent is extended or adjusted under 35 U.S.C. 154(b) by 309 days.

(21) Appl. No.: 18/693,488

(22) PCT Filed: Jun. 2, 2022

(86) PCT No.: PCT/CN2022/096718
§ 371 (c)(1),
(2) Date: Mar. 19, 2024

(87) PCT Pub. No.: WO2023/109028
PCT Pub. Date: Jun. 22, 2023

(65) Prior Publication Data

US 2024/0391361 A1 Nov. 28, 2024

(30) Foreign Application Priority Data

Dec. 16, 2021 (CN) ......................... 202111545632.2
Jan. 26, 2022 (CN) ......................... 202210094903.5

(51) Int. Cl.
*B60N 2/10* (2006.01)
*B60N 2/02* (2006.01)

(52) U.S. Cl.
CPC ........... *B60N 2/10* (2013.01); *B60N 2/02253* (2023.08)

(58) Field of Classification Search
CPC .............................. B60N 2/10; B60N 2/02253
See application file for complete search history.

(56) References Cited

U.S. PATENT DOCUMENTS 3,933,330 A * 1/1976 Gwin ....................... B60N 2/10
248/371
10,239,422 B2 * 3/2019 Schulz ............... B60N 2/42709
(Continued)

FOREIGN PATENT DOCUMENTS

CN 108556695 A 9/2018
CN 213501980 U 6/2021
(Continued)

OTHER PUBLICATIONS

Chinese Office Action from corresponding Application No. 202210094903.5 mailed on Sep. 20, 2025, 16 pages with translation.

(Continued)

*Primary Examiner* — Philip F Gabler
(74) *Attorney, Agent, or Firm* — Tucker Ellis LLP

(57) ABSTRACT

The present invention relates to a seat tilt adjustment mechanism (400) and a vehicle seat including the seat tilt adjustment mechanism (400). The seat tilt adjustment mechanism (400) comprises: a left and a right base link (410*a*, 410*b*); a left and a right tilt adjustment link (420*a*, 420*b*), wherein lower ends of the left and the right tilt adjustment link (420*a*, 420*b*) are hinged to front ends of the left and the right base link (410*a*, 410*b*); a left and a right front link (440*a*, 440*b*), wherein upper ends of the left and the right front link (440*a*, 440*b*) are hinged to front ends of a left and a right link (210*a*, 210*b*) of a seat cushion skeleton assembly (200); a transverse link (450), wherein a left end of the transverse link (Continued)

forms a rotary connection with an upper end of the left tilt adjustment link (420*a*) and a lower end of the left front link (440*a*) respectively, and a right end of the transverse link (450) forms a rotary connection with an upper end of the right tilt adjustment link (420*b*) and a lower end of the right front link (440*b*) respectively; and a driving electric motor mechanism which, by means of a gear-rack structure, can drive the left (420*a*) and the right tilt adjustment link (420*b*) to rotate synchronously, so as to adjust a cushion tilt angle.

19 Claims, 19 Drawing Sheets

(56) References Cited

U.S. PATENT DOCUMENTS

| | | | | |
|---|---|---|---|---|
| 10,479,230 | B2 * | 11/2019 | Shinozaki | B60N 2/06 |
| 11,760,232 | B2 * | 9/2023 | Piotrowski | B60N 2/0276 297/216.12 |
| 11,772,518 | B2 * | 10/2023 | Freisleben | B60N 2/4214 297/313 |
| 2010/0187396 | A1 * | 7/2010 | Gilbert | B60N 2/1615 248/371 |
| 2011/0221248 | A1 | 9/2011 | Schuler et al. | |
| 2013/0161989 | A1 * | 6/2013 | Ito | B60N 2/181 297/344.15 |
| 2019/0152351 | A1 * | 5/2019 | Murakami | B60N 2/161 |
| 2020/0023754 | A1 | 1/2020 | Nakazawa et al. | |
| 2022/0305965 | A1 * | 9/2022 | Lücke | B60N 2/02246 |
| 2023/0141294 | A1 * | 5/2023 | Zuo | B60N 2/1821 296/65.05 |

FOREIGN PATENT DOCUMENTS

| | | | |
|---|---|---|---|
| CN | 113147531 | A | 7/2021 |
| CN | 113147532 | A | 7/2021 |
| CN | 214355644 | U | 10/2021 |
| CN | 214647735 | U | 11/2021 |
| CN | 214929155 | U | 11/2021 |
| CN | 217515013 | U | 9/2022 |
| DE | 2628351 | A1 | 12/1977 |
| DE | 19616915 | C1 | 10/1997 |
| DE | 102010036346 | A1 | 1/2012 |
| FR | 3017343 | A1 | 8/2015 |
| WO | 2014203784 | A1 | 12/2014 |

OTHER PUBLICATIONS

Extended European Search Report from corresponding Application No. 22905794.8 mailed on Jan. 14, 2025, 8 pages.

Chinese Office Action from corresponding Application No. 202210094903.5 mailed on May 28, 2025, 22 pages with translation.

International Search Report and Written Opinion from corresponding International Application No. PCT/CN2022/096718, mailed on Aug. 2, 2022, 6 pages with translation.

* cited by examiner 433b
431b
434b
430a
433a
432a
432b
434a
431a

440a(440b)
210a(4210b)
420a(420b)
410a(410b)

450a'(450b')
420a'(420b')
481a'(481b')
460a'(460b')
470a'(470b')
110a'(110b')
471a'(471b')
472a'(472b')

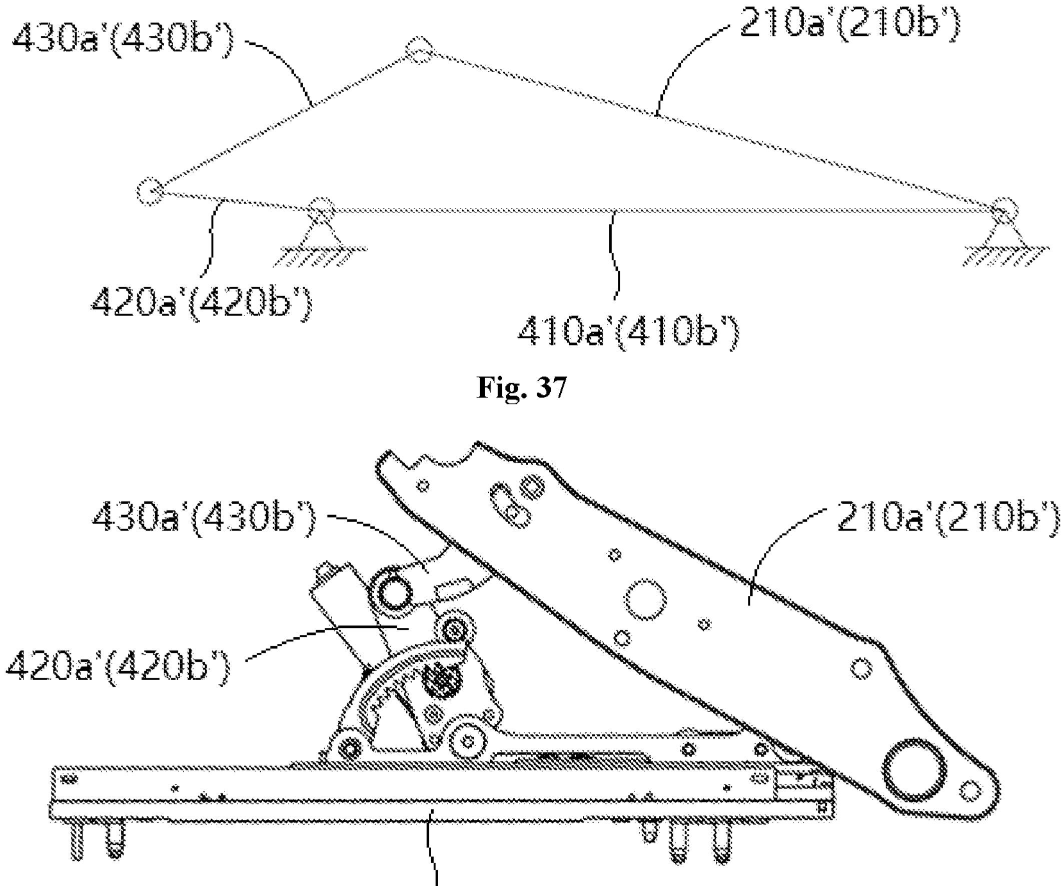
Fig. 37
Fig. 38
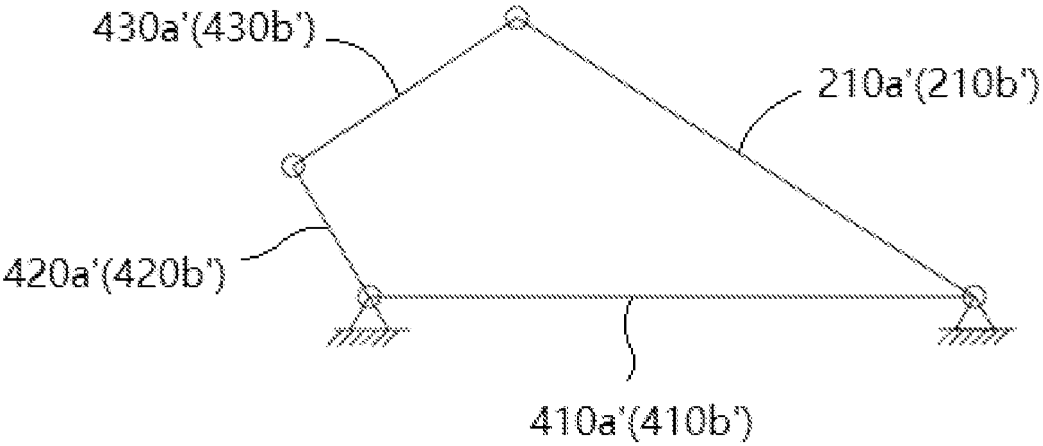
Fig. 39

SEAT TILT ADJUSTMENT MECHANISM AND ZERO-GRAVITY VEHICLE SEAT

TECHNICAL FIELD

The present invention relates to the technical field of an automobile seat, in particular to a seat tilt adjustment mechanism, and to a vehicle seat comprising the seat tilt adjustment mechanism, especially a zero-gravity seat.

BACKGROUND OF INVENTION

With the development and progress of autonomous driving, higher requirements and challenges are set for the comfort of occupants. A zero-gravity vehicle seat is a seat structure that can achieve better comfort, wherein an occupant may have a larger backrest angle and a larger thigh support angle. However, it is impossible to effectively protect the occupant in a zero-gravity posture during the driving of the vehicle on the basis of the existing restraint system.

A zero-gravity vehicle seat may receive an SCM (Safety Control Module) signal of the whole vehicle before a crash danger occurs. Therefore, in a very short time (for example 200 ms to 500 ms), it is necessary to adjust the seat from a zero-gravity posture (for example, in a torso angle of 60 degrees, that is, an angle of the upper torso of the occupant or the dummy lying on the seat or the seat backrest relative to a vertical line are 60 degrees) to a posture that meets the occupant protection restraint system (for example a torso angle of 40 degrees, that is, an angle of the upper torso of the occupant or the dummy lying on the seat or the seat backrest relative to the vertical line are 40 degrees), so as to ensure the safety of the occupant in the zero-gravity posture during the driving of the vehicle, thereby satisfying the better comfort and safety in the L4/L5 autonomous driving scenario.

The shifting between the zero-gravity posture and the normal posture of the zero-gravity vehicle seat is mainly realized by adjustment of a cushion tilt angle by means of a tilt adjustment mechanism. However, the existing tilt adjustment mechanism for a zero-gravity vehicle seat has the problem of a limited tilt stroke.

Therefore, the applicant has found the measures to solve the above-mentioned problem through beneficial exploration and research. Technical solutions to be introduced below are generated under such background.

SUMMARY OF INVENTION

One of the technical problems to be solved by the present invention is to provide a seat tilt adjustment mechanism in view of the defects in the prior art.

Another technical problem to be solved by the present invention is to provide a vehicle seat, especially a zero-gravity seat, comprising the seat tilt adjustment mechanism.

In a first aspect of the present invention, a seat tilt adjustment mechanism is provided, comprising:

- a left and a right base link fixedly mounted to a left and a right link of a seat frame assembly;
- a left and a right tilt adjustment link, wherein lower ends of the left and the right tilt adjustment link are hinged to front ends of the left and the right base link;
- a left and a right front link, wherein upper ends of the left and the right front link are hinged to front ends of a left and a right link of a seat cushion skeleton assembly;
- a transverse link, wherein a left end of the transverse link forms a rotary connection with an upper end of the left tilt adjustment link and a lower end of the left front link respectively, and a right end of the transverse link forms a rotary connection with an upper end of the right tilt adjustment link and a lower end of the right front link respectively; and
- a driving electric motor mechanism, wherein the driving electric motor mechanism can drive the left and the right tilt adjustment link to rotate synchronously by means of a gear-rack structure, so as to adjust a cushion tilt angle.

In one preferred embodiment of the present invention, the gear-rack structure includes a left and a right driving gear and a left and a right arc-shaped rack which are meshed with each other, wherein ones of the left and the right driving gear and the left and the right arc-shaped rack are arranged on the left and the right tilt adjustment link, and the others of the left and the right driving gear and the left and the right arc-shaped rack are arranged on the left and the right base link.

In one preferred embodiment of the present invention, the driving electric motor mechanism includes a left and a right driving electric motor assembly fixedly mounted to inner sides of the left and the right base link, wherein the left and the right driving gear are fixedly mounted to outputs of the left and the right driving electric motor assembly, wherein the left and the right arc-shaped rack are integrated in the left and the right tilt adjustment link.

In one preferred embodiment of the present invention, the left and the right tilt adjustment link are configured as a left and a right toothed plate link, which have a left and a right arc-shaped toothed elongated hole, wherein the left and the right driving gear are located in the left and the right arc-shaped toothed elongated hole of the left and the right toothed plate link and are meshed with the left and the right arc-shaped toothed elongated hole. When the driving electric motor mechanism works, the left and the right driving gear are driven to rotate by the left and the right driving electric motor assembly, wherein a rotation angle of the left and the right toothed plate link is controlled in the case where the left and the right driving gear are guided by the left and the right arc-shaped toothed elongated hole. In this way, it is possible to adjust a cushion tilt angle and a backrest tilt angle related to the cushion tilt angle.

In one preferred embodiment of the present invention, both the left and the right toothed plate link include:

- an inner link having the left or the right arc-shaped toothed elongated hole, wherein an upper end of the inner link is provided with an inner rotation through hole to be sleeved on the left end or the right end of the transverse link, and a first mounting hole, for example, a connection screw hole, is provided at one side of the left or the right arc-shaped toothed elongated hole of the inner link; and
- an outer link fixedly arranged on an outer side of the inner link, wherein a gap is formed between the inner link and the outer link, wherein an upper end of the outer link is provided with an outer rotation through hole, which is coaxial with the inner rotation through hole and is configured to be sleeved on the left end or the right end of the transverse link, wherein a lower end of the outer link is provided with a second mounting hole (for example, a connection through hole) coaxial with the first mounting hole (for example a connection screw hole);

wherein the front end of the left or the right base link is provided with a base through hole.

In one preferred embodiment of the present invention, upon installation, the front end of the left or the right base link enters the gap formed between the inner link and the outer link, wherein the connection screw hole of the inner link, the connection through hole of the outer link and the base through hole of the left or the right base link are arranged coaxially; then, the first step bolt sequentially passes through the connection through hole, the base through hole and the connection screw hole and is screwed in the connection screw hole, so that the left or the right toothed plate link is rotatable relative to the left or the right base link around the first step bolt. Here, the first step bolt forms an exemplary rotation shaft. It is self-evident that, other forms of rotation shafts are also possible.

In one preferred embodiment of the present invention, a first bushing is sleeved in the base through hole of the left or the right base link and forms a rotary contact with the rotation shaft, for example the first step bolt.

In one preferred embodiment of the present invention, the left and the right toothed plate link further include a second bushing and a first Y-direction washer respectively, wherein the second bushing is sleeved on the left end or the right end of the transverse link, wherein an inner and an outer end of the second bushing protrude from the inner rotation through hole of the inner link and the outer rotation through hole of the outer link, wherein the inner and the outer end of the second bushing are formed with an inner and an outer radial flange protruding outward, wherein the Y-direction washer is sleeved on the second bushing and is located between the inner link and the outer link. In the sense of the present invention, the Y-direction washer means that the washer has a central axis extending in the Y direction or in the transverse direction in the vehicle coordinate system.

In one preferred embodiment of the present invention, the left and the right toothed plate link further include a connection rivet and a second Y-direction washer respectively, wherein an inner and an outer end of the connection rivet pass through an inner rivet through hole provided in the inner link and an outer rivet through hole provided in the outer link, wherein the connection rivet is squeezed into a rivet connection, and the second Y-direction washer is sleeved on the connection rivet and is located between the inner link and the outer link.

In one preferred embodiment of the present invention, the left and the right toothed plate link further include a connection nut respectively, which is fixedly welded on an inner side of the inner link and is coaxial with the connection screw hole, wherein the connection nut is formed with an accommodating chamber for accommodating a front end of the first step bolt, wherein an inner side of the connection nut abuts against an electric motor mounting plate of the left or the right driving electric motor assembly, wherein a second step bolt passes through a through hole in the electric motor mounting plate and is screwed into the connection nut, so that the left or the right toothed plate link is rotatable relative to the electric motor mounting plate around the second step bolt.

In one preferred embodiment of the present invention, a third bushing is sleeved in the through hole of the electric motor mounting plate and forms a rotary contact with the second step bolt.

In one preferred embodiment of the present invention, the left and the right toothed plate link further include a reinforcing toothed plate respectively, which is fixedly mounted to an inner side of the inner link and is formed with a reinforcing arc-shaped toothed elongated holes which is configured identically to the left or the right arc-shaped toothed elongated hole.

In one preferred embodiment of the present invention, the lower ends of the left and the right front link are provided with rotation through holes to be sleeved on the left and the right end of the transverse link.

In one preferred embodiment of the present invention, the transverse link is a hollow pipe, wherein a torsion spring for fast restoration of the seat cushion skeleton assembly is mounted in the transverse link.

In one preferred embodiment of the present invention, the torsion spring includes a first and a second torsion bar, wherein a left end of the first torsion bar extends out of the transverse link, a right end of the first torsion bar is held by the transverse link, a right end of the second torsion bar extends out of the transverse link, and a left end of the second torsion bar is held by the transverse link, wherein the left end of the first torsion bar and the right end of the second torsion bar are operatable by the left and the right front link and/or the left and the right tilt adjustment link when the cushion tilt angle is enhanced, so that the first and the second torsion bar are tightened.

In one preferred embodiment of the present invention, the torsion spring includes a first and a second torsion bar, and a left and a right countersunk portion are formed by recession inwards on a pipe surface of the transverse link in positions proximate to the left and the right end of the transverse link. In a further solution, the first torsion bar is located in the transverse link, wherein a left end of the first torsion bar extends out of the transverse link and is formed as a left outer hook and is preferably positioned by a left torsion spring centering plastic member, and a right end of the first torsion bar is formed as a right inner hook and engages the right countersunk portion of the transverse link, and/or wherein the second torsion bar is located in the transverse link, wherein a left end of the second torsion bar is formed as a left inner hook and engages the left countersunk portion of the transverse link, and a right end of the second torsion bar extends out of the transverse link and is formed as a right outer hook and preferably is positioned by a right torsion spring centering plastic member.

In a further solution, the lower ends of the left and the right front link are provided with a left and a right front link hook, and the upper ends of the outer links of the left and the right toothed plate link are provided with a left and a right outer link hook.

When the cushion tilt angle is in a normal position, the left outer hook of the first torsion bar and the right outer hook of the second torsion bar engage the left and the right front link hook of the left and the right front link respectively, so that the torsion spring is in a pre-tightened state. At this time, the left outer hook of the first torsion bar and the right outer hook of the second torsion bar are not in contact with the left and the right outer link hook of the outer links of the left and the right toothed plate link.

When the cushion tilt angle is switched from the normal position to a maximum position, the left and the right outer link engage the left outer hook of the first torsion bar and the right outer hook of the second torsion bar during a rotation process, so that the left outer hook of the first torsion bar and the right outer hook of the second torsion bar are disengaged from the left and the right front link hook, so that the torsion spring generates an enhanced torque.

When the cushion tilt angle is switched from the maximum position to the normal position, the left outer hook of the first torsion bar and the right outer hook of the second torsion bar exert a rotation force on the left and the right outer link hook under the action of a torsion force, so that the outer links of the left and the right toothed plate link perform fast rotation to allow fast restoration of the seat cushion skeleton assembly.

In one preferred embodiment of the present invention, a left and a right Y-direction limiting gasket are provided on the transverse link in positions proximate to the left and the right end of the transverse link.

In one preferred embodiment of the present invention, the driving electric motor mechanism includes a left and a right driving electric motor assembly fixedly mounted to inner sides of the left and the right tilt adjustment link, wherein outputs of the left and the right driving electric motor assembly pass through a left and a right shaft hole in the left and the right tilt adjustment link and are exposed on outer sides of the left and the right tilt adjustment link. In a further solution, the gear-rack structure includes a left and a right driving gear and a left and a right arc-shaped rack, wherein the left and the right driving gear are fixedly mounted to the outputs of the left and the right driving electric motor assembly, wherein first ends of the left and the right arc-shaped rack are hinged to the front ends of the left and the right base link and are located on front sides of the left and the right tilt adjustment link, wherein the left and the right arc-shaped rack and the left and the right driving gear are permanently kept in a meshed state through stop parts; when the driving electric motor mechanism works, the left and the right driving gear are driven to rotate by the left and the right driving electric motor assembly, wherein a rotation angle of the left and the right tilt adjustment link is controlled in the case where the left and the right driving gear are guided by the left and the right arc-shaped rack.

In one preferred embodiment of the present invention, the driving electric motor mechanism further includes a synchronizing rod located between the left and the right driving electric motor assembly, wherein a left and a right end of the synchronizing rod penetrate into the left and the right driving electric motor assembly and are connected with outputs of the left and the right driving electric motor assembly to ensure the synchronization of the left and the right driving electric motor assembly.

In one preferred embodiment of the present invention, the seat tilt adjustment mechanism further includes a connection bent pipe located between the left and the right tilt adjustment link, wherein a left and a right end of the connection bent pipe are connected to inner sides of the left and the right tilt adjustment link.

In one preferred embodiment of the present invention, the stop parts are arranged on the left and the right tilt adjustment link, and a left and a right rack limiting gap are formed between the stop parts and the left and the right driving gear.

In one preferred embodiment of the present invention, the stop parts include a left and a right stop bolt mounted to outer sides of the left and the right tilt adjustment link, wherein a left and a right rack limiting gap are formed between the left and the right stop bolt and the left and the right driving gear, and the left and the right arc-shaped rack are permanently located in the left and the right rack limiting gap during a rotation process, so that the left and the right driving gear are permanently meshed with teeth formed on inner arc surfaces of the left and the right arc-shaped rack.

In one preferred embodiment of the present invention, the stop parts include a left and a right stop bolt and a left and a right backlash bushing, wherein the left and the right backlash bushing are fixedly mounted to outer sides of the left and the right tilt adjustment link through the left and the right stop bolt, wherein a left and a right rack limiting gap are formed between the left and the right backlash bushing and the left and the right driving gear, wherein the left and the right arc-shaped rack are permanently located in the left and the right rack limiting gap during a rotation process, so that the left and the right driving gear are permanently meshed with teeth formed on inner arc surfaces of the left and the right arc-shaped rack.

In a second aspect of the present invention, a vehicle seat, especially a zero-gravity seat is provided. The seat comprises a seat frame assembly, a seat cushion skeleton assembly, a seat cushion assembly and a tilt adjustment mechanism according to any one of the embodiments of the present invention, wherein the seat cushion skeleton assembly is mounted to the seat frame assembly, the seat cushion assembly covers the seat cushion skeleton assembly, and the tilt adjustment mechanism is arranged between the seat frame assembly and the seat cushion skeleton assembly for adjusting a tilt angle of the seat cushion skeleton assembly relative to the seat frame assembly.

By using the above technical solutions, the present invention may have any one or more of the following beneficial effects:

1. Under the same space condition, the cushion tilt stroke is effectively improved in the present invention, wherein the left and the right tilt adjustment link are driven to rotate, so as to adjust the cushion tilt angle;
2. Under the same arrangement operation condition, the driving electric motors and the toothed plates are provided at two sides, wherein the driving electric motor mechanism has a high locking strength, so that the seat tilt adjustment mechanism may be adapted to an ABTS seat;
3. Under the same space condition, in comparison with the existing arrangement mode, the driving electric motors in the present invention may be stationary, thereby effectively saving the movement space caused by the movement of the driving electric motors;
4. Under the same space condition, in comparison with the existing arrangement mode, the occupied space is reduced by the present invention;
5. The toothed plate structure in the present invention, together with the support by the torsion spring, may realize fast restoration of the seat cushion and better protection for the safety of an occupant;
6. Under the operation condition of the same stroke of the seat tilt angle, the present invention may effectively realize the adjustment of the gaps by the stop parts, thereby avoiding the potential occurrence of abnormal noise.

BRIEF DESCRIPTION OF DRAWINGS

In order to more clearly explain embodiments of the present invention or technical solutions in the prior art, the accompanying drawings for the description of the embodiments or the prior art are briefly introduced below. Obviously, only some embodiments of the present invention are shown in the following accompanying drawings. For those skilled in the art, other embodiments may also be achieved on the basis of the embodiments shown in the accompanying drawings without inventive efforts.

FIG. 37 is a simplified schematic view of the links of the seat tilt adjustment mechanism according to the second embodiment of the present invention when the cushion tilt angle is in the normal position.

FIG. 38 is a side view of the seat tilt adjustment mechanism according to the second embodiment of the present invention when the cushion tilt angle is in the maximum position.

FIG. 39 is a simplified schematic view of the links of the seat tilt adjustment mechanism according to the second embodiment of the present invention when the cushion tilt angle is in the maximum position.

EMBODIMENTS

In order to make the technical means, creative features, objects and effects realized by the present invention easily understood, the present invention will be further interpreted in view of the accompany drawings.

First, a vehicle seat according to a first embodiment of the present invention is described with reference to FIGS. 1 to 24, which includes a seat tilt adjustment mechanism according to a first embodiment.

Referring to FIGS. 1 to 5, a vehicle seat, in particular a zero-gravity vehicle seat or a zero-gravity seat is shown. The vehicle seat includes a seat frame assembly 100, a seat cushion skeleton assembly 200, a seat cushion assembly 300, and a seat tilt adjustment mechanism 400. The seat cushion skeleton assembly 200 is mounted to the seat frame assembly 100, and the seat cushion assembly 300 covers the seat cushion skeleton assembly 200. The seat tilt adjustment mechanism 400 is arranged between the seat frame assembly 100 and the seat cushion skeleton assembly 200 for adjusting a tilt angle of the seat cushion skeleton assembly 200 relative to the seat frame assembly 100, so that the seat cushion skeleton assembly 200 can be switched between a normal position of the cushion tilt angle (shown in FIG. 1 or FIG. 3) and a maximum position of the cushion tilt angle (shown in FIG. 2, FIG. 3 or FIG. 5).

Figures 1, 2:
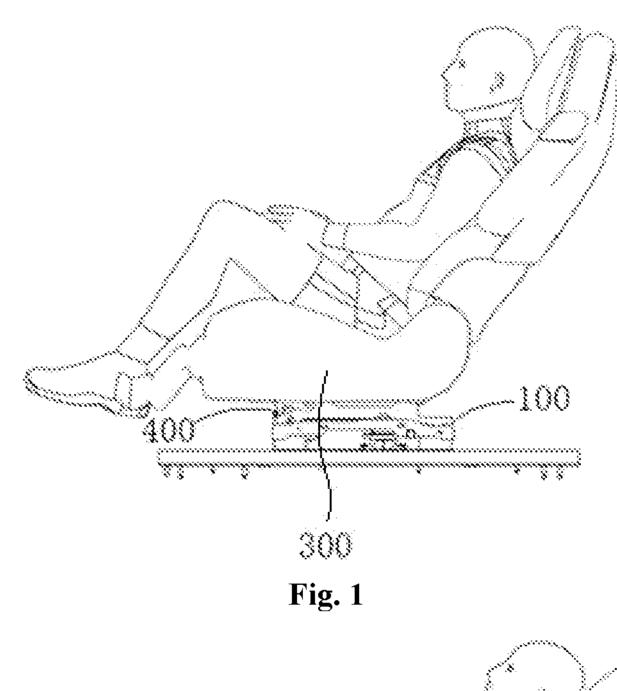
FIG. 1 is a schematic structural view of a zero-gravity vehicle seat according to a first embodiment of the present invention when a tilt angle of a cushion is in a normal position.
FIG. 2 is a schematic structural view of the zero-gravity vehicle seat according to the first embodiment of the present invention when the cushion tilt angle is in a maximum position.
Figure 3:
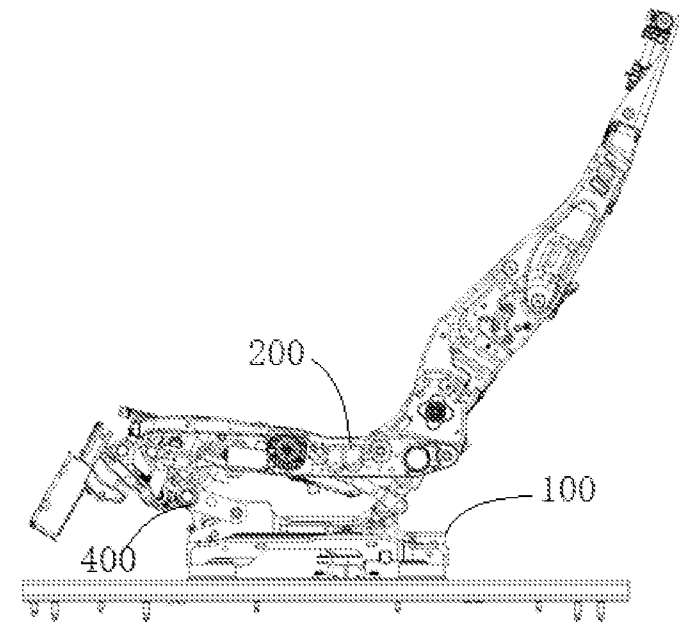
FIG. 3 is a schematic structural view of the zero-gravity vehicle seat according to the first embodiment of the present invention when the cushion tilt angle is in the normal position, wherein a seat cushion assembly is omitted.
Figure 4:
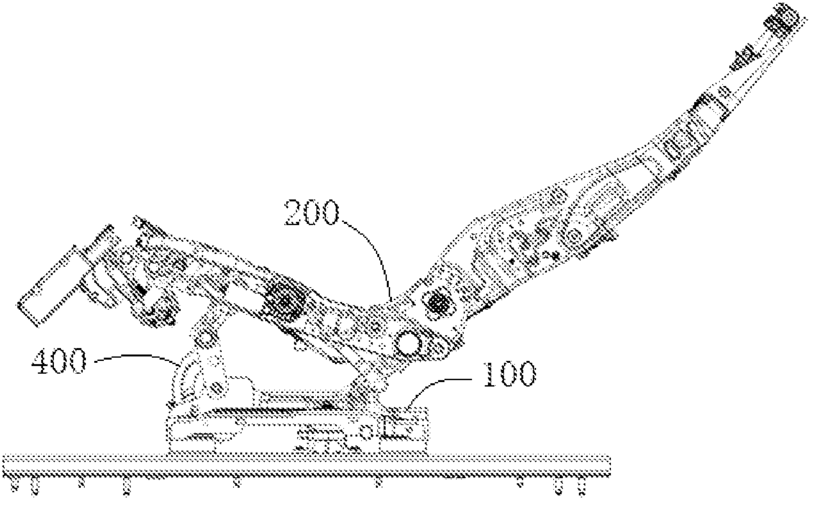
FIG. 4 is a schematic structural view of the zero-gravity vehicle seat according to the first embodiment of the present invention when the cushion tilt angle is in the maximum position, wherein the seat cushion assembly is omitted.
Figure 5:
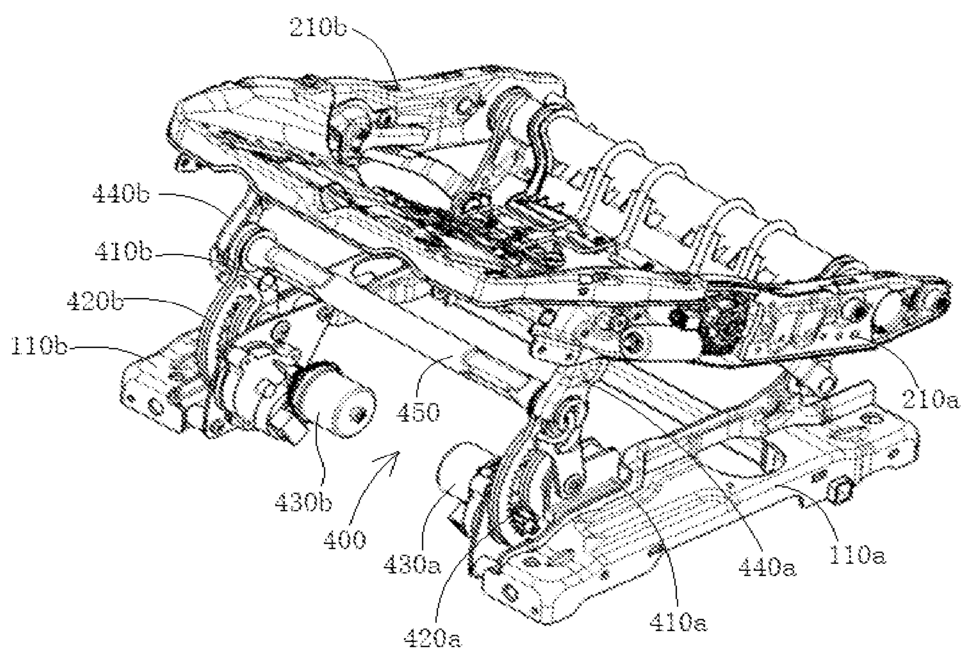
FIG. 5 is an assembly schematic view of a seat frame assembly, a seat cushion assembly and a tilt adjustment mechanism of the zero-gravity vehicle seat according to the first embodiment of the present invention.
Figure 6:
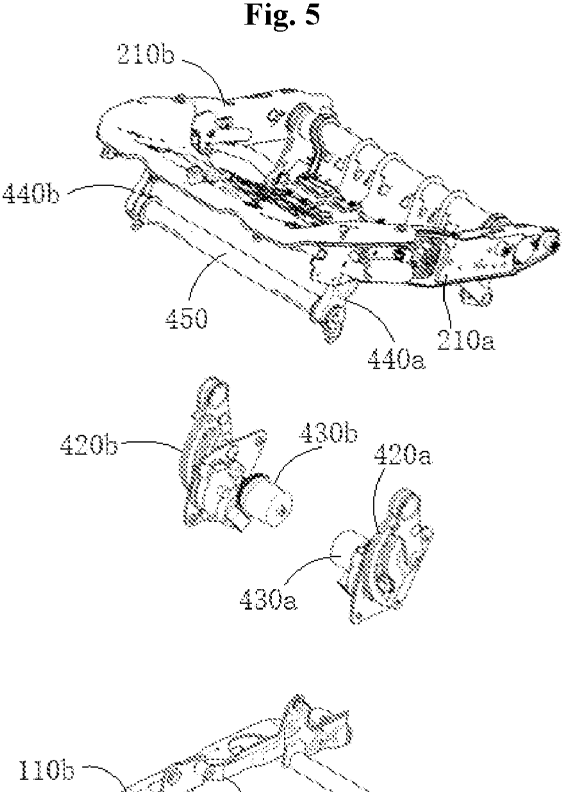
FIG. 6 is an exploded schematic structural view of FIG. 5.
Figure 6:
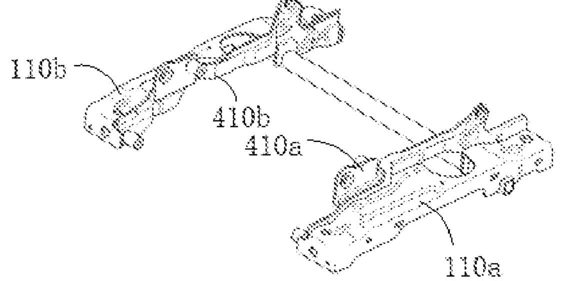
Figure 7:
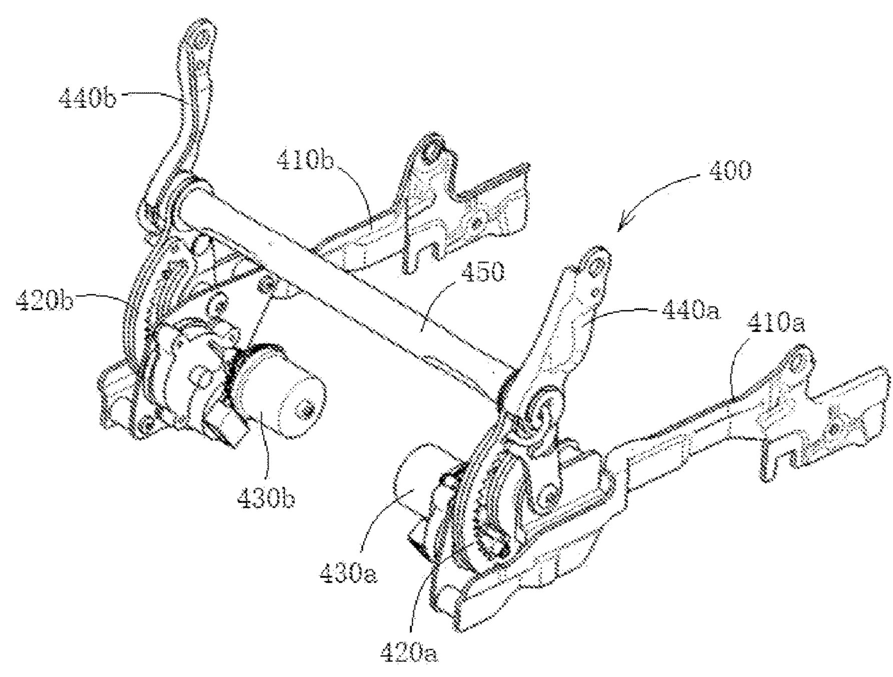
FIG. 7 is a schematic structural view of the seat tilt adjustment mechanism according to the first embodiment of the present invention.
Figure 8:
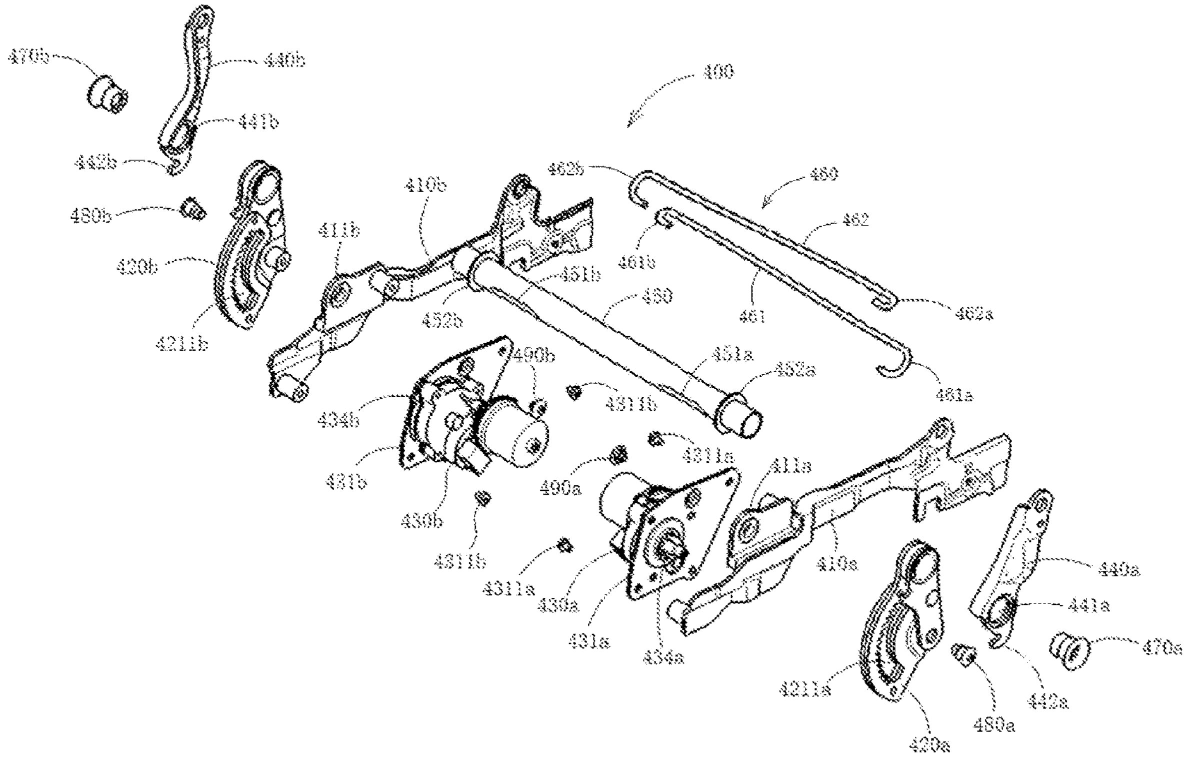
FIG. 8 is an exploded structural schematic view of the seat tilt adjustment mechanism according to the first embodiment of the present invention.

Referring to FIGS. 7 and 8 in combination with FIG. 6, the seat tilt adjustment mechanism 400 includes a left and a right base link 410*a*, 410*b*, a left and a right tilt adjustment link 420*a*, 420*b*, a left and a right front link 440*a*, 440*b*, a transverse link 450 and a driving electric motor mechanism.

The left and the right base link 410*a*, 410*b* are fixedly mounted to inner sides of the left and the right link 110*a*, 110*b* of the seat frame assembly 100.

The left and the right tilt adjustment link 420*a*, 420*b* are rotatably arranged at front ends of the left and the right base link 410*a*, 410*b*.

Upper ends of the left and the right front link 440*a*, 440*b* are hinged to front ends of the left and the right link 210*a* and 210*b* of the seat cushion skeleton assembly 200.

A left end of the transverse link 450 is rotatably connected with the left tilt adjustment link 420*a* and a lower end of the left front link 440*a* respectively, and a right end of the transverse link 450 is rotatably connected with an upper end of the right tilt adjustment link 420*b* and a lower end of the right front link 440*b* respectively. Specifically, the left end of the transverse link 450 passes through the upper end of the left tilt adjustment link 420*a* and the lower end of the left front link 440*a* to form a rotary connection, and the right end of the transverse link 450 passes through the upper end of the right tilt adjustment link 420*b* and the lower end of the right front link 440*b* to form a rotary connection.

The driving electric motor mechanism can drive the left tilt adjustment link 420*a* and the right tilt adjustment link 420*b* to rotate synchronously by means of a gear-rack structure, so as to adjust a cushion tilt angle. The driving electric motor mechanism may be configured in a structural form with electric motors at two sides, which includes a left and a right driving electric motor assembly 430*a*, 430*b*, wherein the left and the right driving electric motor assembly 430*a*, 430*b* are fixedly mounted to the inner sides of the left and the right base link 410*a*, 410*b*. The gear-rack structure includes: —a left and a right driving gear 434*a*, 434*b* fixedly mounted to outputs of the left and the right driving electric motor assembly 430*a*, 430*b*, and —a left and a right toothed plate, which are integrated into the left and the right tilt adjustment link 420*a*, 420*b* and thus constitute a left and a right toothed plate link. The left and the right toothed plate link 420*a*, 420*b* are formed with a left and a right arc-shaped toothed elongated hole 4211*a*, 4211*b*, wherein the left and the right driving gear 434*a* and 434*b* of the left and the right driving electric motor assembly 430*a*, 430*b* are located in the left and the right arc-shaped toothed elongated hole 4211*a*, 4211*b* of the left and the right toothed plate link 420*a*, 420*b* and are meshed with the left and the right arc-shaped toothed elongated hole 4211*a*, 4211*b*. When the driving electric motor mechanism works, the left and the right driving electric motor assembly 430*a*, 430*b* drive the left and the right driving gear 434*a* and 434*b* to rotate, wherein a rotation angle of the left and the right toothed plates link 420*a*, 420*b* is controlled in the case where the left and the right driving gear 434*a* and 434*b* are guided by the left and the right arc-shaped toothed elongated hole 4211*a* and 4211*b*.

Figures 9, 10:
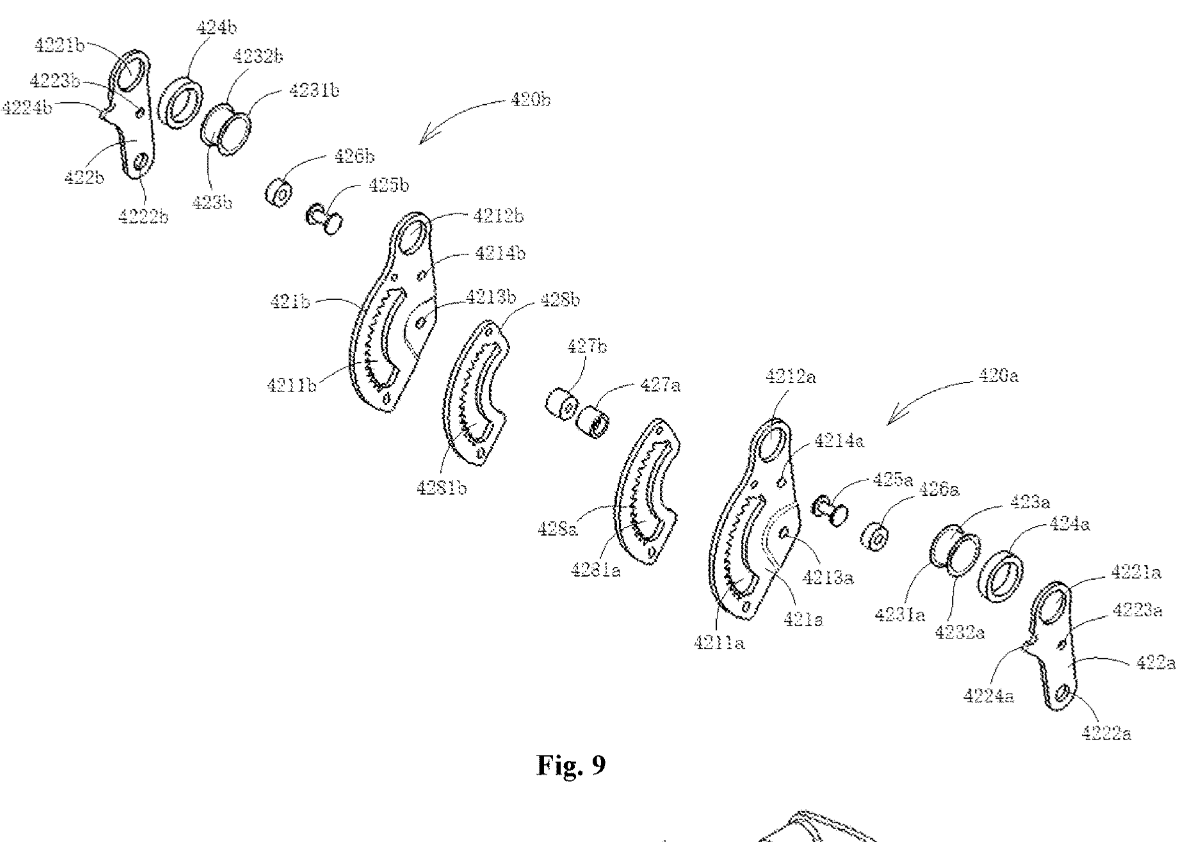
FIG. 9 is an exploded schematic structural view of a left and a right toothed plate link according to the first embodiment of the present invention.
FIG. 10 is a schematic structural view of a left and a right driving electric motor assembly according to the first embodiment of the present invention.
Figure 11:
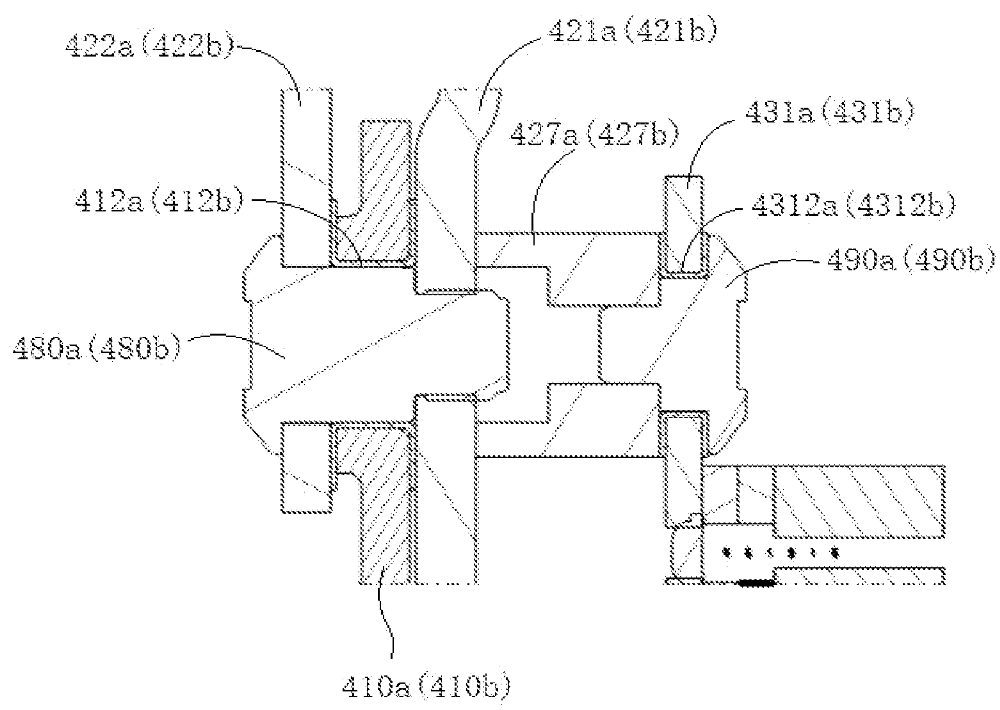
FIG. 11 is a cross-sectional view in a connection region between the left and the right toothed plate link and a left and a right base link according to the first embodiment of the present invention.
Figure 12:
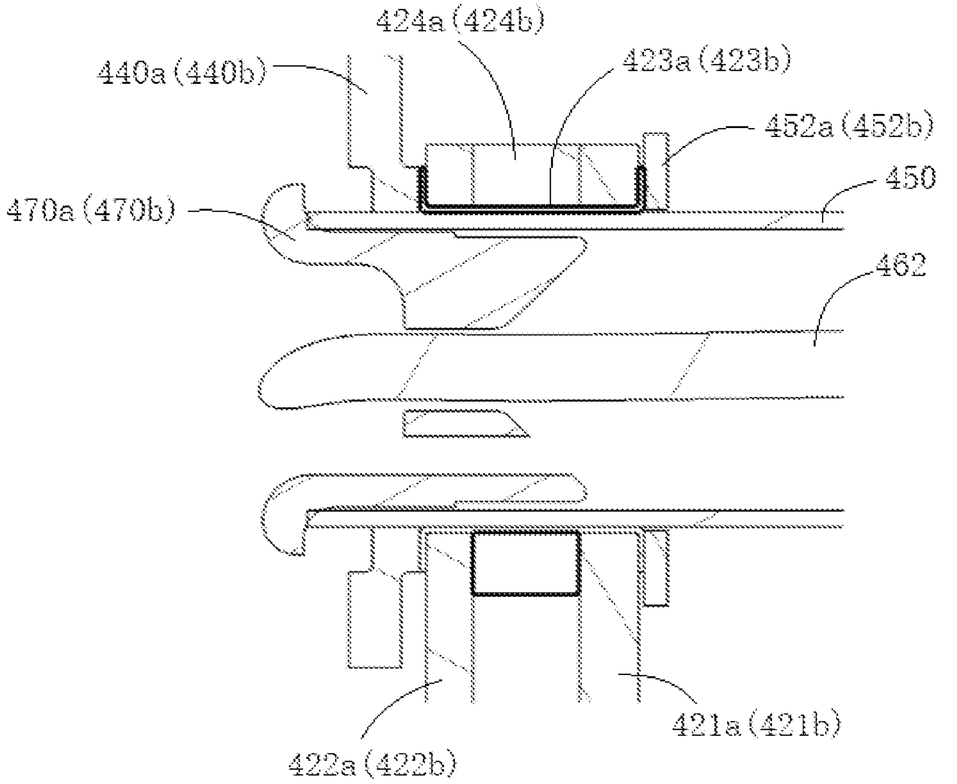
FIG. 12 is a cross-sectional view in a connection region between the left and the right toothed plate link, a left and a right front link, and a transverse link according to the first embodiment of the present invention.

Referring to FIG. 9 in combination with FIGS. 7 and 8, the left toothed plate link 420*a* includes an inner link 421*a* and an outer link 422*a*.

The inner link 421*a* is formed with a left arc-shaped toothed elongated hole 4211*a*, an upper end of the inner link 421*a* is formed with an inner rotation through hole 4212*a* to be sleeved on the left end of the transverse link 450, and a connection screw hole 4213*a* is formed on one side of the left arc-shaped toothed elongated hole 4211*a* of the inner link 421*a*.

The outer link 422*a* is fixedly arranged on an outer side of the inner link 421*a*, wherein a gap is formed between the outer link and the inner link. An upper end of the outer link 422*a* is provided with an outer rotation through hole 4221*a*, which is coaxial with the inner rotation through hole 4212*a* and is configured to be sleeved on the left end of the transverse link 450. A lower end of the outer link 422*a* is provided with a connection through hole 4222*a*, which is coaxial with the connection screw hole 4213*a*.

The front end of the left base link 410*a* is provided with a base through hole 411*a*.

Upon installation, the front end of the left base link 410*a* enters the gap formed between the inner link 421*a* and the outer link 422*a*; wherein the connection screw hole 4213*a* of the inner link 421*a*, the connection through hole 4222*a* of the outer link 422*a* and the base through hole 411*a* of the left base link 410*a* are arranged coaxially. Then, a step bolt 480*a* passes through the connection through hole 4222*a*, the base through hole 411*a* and the connection screw hole 4213*a* sequentially, and is screwed in the connection screw hole 4213*a*, so that the left toothed plate link 420*a* can rotate around the step bolt 480*a* relative to the left base link 410*a*. A bushing 412*a* is sleeved in the base through hole 411*a* of the left base link 410*a* and forms a rotary contact with the step bolt 480*a*, so as to ensure a smooth rotation and reduce the wear.

Referring to FIGS. 9 to 12 in combination with FIGS. 7 and 8, the right toothed plate link 420*b* includes an inner link 421*b* and an outer link 422*b*.

The inner link 421*b* is formed with a right arc-shaped toothed elongated hole 4211*b*, wherein an upper end of the inner link 421*b* is provided with an inner rotation through hole 4212*b* to be sleeved on the right end of the transverse link 450, and a connection screw hole 4213*b* is provided on one side of the right arc-shaped toothed elongated hole 4211*b* of the inner link 421*b*.

The outer link 422*b* is fixedly arranged on an outer side of the inner link 421*b*, wherein a gap is formed between the inner link and the outer link. An upper end of the outer link 422*b* is provided with an outer rotation through hole 4221*b*, which is coaxial with the inner rotation through hole 4212*b* and is configured to be sleeved on the right end of the transverse link 450. A lower end of the outer link 422*b* is provided with a connection through hole 4222*b*, which is coaxial with the connection screw hole 4213*b*.

The front end of the right base link 410*b* is provided with a base through hole 411*b*.

Upon installation, the front end of the right base link 410*b* enters the gap formed between the inner link 421*b* and the outer link 422*b*, wherein the connection screw hole 4213*b* of the inner link 421*b*, the connection through hole 4222*b* of the outer link 422*b* and the base through hole 411*b* of the right base link 410*b* are arranged coaxially. Then, a step bolt 480*b* passes through the connection through hole 4222*b*, the base through hole 411*b* and the connection screw hole 4213*b* sequentially, and is screwed in the connection screw hole 4213*b*, so that the right toothed plate link 420*b* can rotate around the step bolt 420*b* relative to the right base link 410*b*. A bushing 412*b* is sleeved in the base through hole 411*b* of the right base link 410*b* and forms a rotary contact with the step bolt 480*b*, so as to ensure a smooth rotation and reduce the wear.

The left toothed plate link 420*a* further includes a bushing 423*a* and a Y-direction washer 424*a*. The bushing 423*a* is sleeved on the left end of the transverse link 450, and its inner and outer end pass through the inner rotation through hole 4212*a* of the inner link 421*a* and the outer rotation through hole 4221*a* of the outer link 422*a*. The inner and the outer end of the bushing 423*a* are formed with an inner and an outer radial flange 4231*a*, 4232*a* protruding outward for positioning the inner link 421*a* and the outer link 422*a*, and the Y-direction washer 424*a* is sleeved on the bushing 423*a* and is located between the inner link 421*a* and the outer link 422*a*, so that a certain gap is maintained between the inner link 421*a* and the outer link 422*a*.

The right toothed plate link 420*b* further includes a bushing 423*b* and a Y-direction washer 424*b*. The bushing 423*b* is sleeved on the right end of the transverse link 450, and its inner and outer end pass through the inner rotation through hole 4212*b* of the inner link 421*b* and the outer rotation through hole 4221*b* of the outer link 422*b*. The inner and the outer end of the bushing 423*b* are formed with an inner and an outer radial flange 4231*b*, 4232*b* protruding outward for positioning the inner link 421*b* and the outer link 422*b*. The Y-direction washer 424*b* is sleeved on the bushing 423*b* and is located between the inner link 421*b* and the outer link 422*b*, so that a certain gap is maintained between the inner link 421*b* and the outer link 422*b*.

The left toothed plate link 420*a* further includes a connection rivet 425*a* and a Y-direction washer 426*a*. An inner and an outer end of the connection rivet 425*a* protrude from an inner rivet through hole 4214*a* formed in the inner link 421*a* and an outer rivet through hole 4223*a* formed in the outer link 422*a*, and then the connection rivet is squeezed into a rivet connection. The Y-direction washer 426*a* is sleeved on the connection rivet 425*a* and is located between the inner link 421*a* and the outer link 422*a*, so that on the one hand, the inner link 421*a* is fixedly connected with the outer link 422*a*, and on the other hand, a certain gap is maintained between the inner link 421*a* and the outer link 422*a*.

The right toothed plate link 420*b* further includes a connection rivet 425*b* and a Y-direction washer 426*b*. An inner and an outer end of the connection rivet 425*b* protrude from an inner rivet through hole 4214*b* formed in the inner link 421*b* and an outer rivet through hole 4223*b* formed in the outer link 422*b*, and then the connection rivet is squeezed into a rivet connection. The Y-direction washer 426*b* is sleeved on the connection rivet 425*b* and is located between the inner link 421*b* and the outer link 422*b*, so that on the one hand, the inner link 421*b* is fixedly connected with the outer link 422*b*, and on the other hand, a certain gap is maintained between the inner link 421*b* and the outer link 422*b*.

The left toothed plate link 420*a* further includes a connection nut 427*a*, which is fixedly welded on an inner side of the inner link 421*a* and is coaxial with the connection screw hole 4213*a*. The connection nut 427*a* is formed with an accommodating chamber for accommodating a front end of a step bolt 480*a*, and an inner side of the connection nut 427*a* abuts against a left electric motor mounting plate 431*a* of the left driving electric motor assembly 430*a*. The step bolt 490*a* passes through a through hole in the left electric motor mounting plate 431*a* and is then screwed into the connection nut 427*a*, so that the left toothed plate link 420*a* can rotate around the step bolt 490*a* relative to the left electric motor mounting plate 431*a* of the left driving electric motor assembly 430*a*. A bushing 4312*a* is sleeved in the through hole of the left electric motor mounting plate 431*a* of the left driving electric motor assembly 430*a* and forms a rotary contact with the step bolt 490*a*, so as to ensure a smooth rotation and reduce the wear.

The right toothed plate link 420*b* also includes a connection nut 427*b*, which is fixedly welded on an inner side of the inner link 421*b* and is coaxial with a connection screw hole 4213*b*. The connection nut 427*b* is formed with an accommodating chamber for accommodating a front end of a step bolt 490*b*, and an inner side of the connection nut 427*b* abuts against a right electric motor mounting plate 431*b* of the right driving electric motor assembly 430*b*. The step bolt 490*b* passes through a through hole in the right electric motor mounting plate 431*b* of the right driving electric motor assembly 430*b* and is then screwed into the connection nut 427*b*, so that the right toothed plate link 420*b* can rotate around the step bolt 490*b* relative to the right electric motor mounting plate 431*b* of the right driving electric motor assembly 430*b*. A bushing 4312*b* is sleeved in the through hole of the right electric motor mounting plate 431*b* of the right driving electric motor assembly 430*b* and forms a rotary contact with the step bolt 490*b*, so as to ensure a smooth rotation and reduce the wear.

The left toothed plate link 420*a* further includes a reinforcing toothed plate 428*a* fixedly mounted to the inner side of the inner link 421*a* by rivets or other fasteners, wherein the reinforcing toothed plate 428*a* is formed with a reinforcing arc-shaped toothed elongated hole 4281*a* which is configured identically to the left arc-shaped toothed elongated hole 4211*a*, so as to improve the strength of the gear-rack structure.

The right toothed plate link 420*b* also includes a reinforcing toothed plate 428*b* fixedly mounted to the inner side of the inner link 421*b* by rivets or other fasteners, wherein the reinforcing toothed plate 428*b* is formed with a reinforcing arc-shaped toothed elongated hole 4281*b* which is configured identically to the right arc-shaped toothed elongated hole 4211*b*, so as to improve the strength of the gear-rack structure.

The lower ends of the left and the right front link 440*a*, 440*b* are provided with a left and a right front link rotation through hole 441, 441*b* to be sleeved on the left and the right end of the transverse link 450.

Referring to FIG. 10 in combination with FIG. 8, the left driving electric motor assembly 430*a* includes the left electric motor mounting plate 431*a*, a left driving electric motor 432*a*, a left reduction gear mechanism 433*a* and a left driving gear 434*a*. The left electric motor mounting plate 431*a* is mounted to the inner side of the left base link 410*a* through a plurality of electric motor mounting bolts 4311*a*, the left driving electric motor 432*a* is mounted to the left electric motor mounting plate 431*a*, the left reduction gear mechanism 433*a* is mounted to the left electric motor mounting plate 431*a* and is connected with an output shaft of the left driving electric motor 432*a*, and the left driving gear 434*a* is mounted to an output of the left reduction gear mechanism 433*a*.

The right driving electric motor assembly 430*b* includes the right electric motor mounting plate 431*b*, a right driving electric motor 432*b*, a right reduction gear mechanism 433*b* and a right driving gear 434*b*. The right electric motor mounting plate 431*b* is mounted to the inner side of the right base link 410*b* through a plurality of electric motor mounting bolts 4311*b*, the right driving electric motor 432*b* is mounted to the right electric motor mounting plate 431*b*, the right reduction gear mechanism 433*b* is mounted to the right electric motor mounting plate 431*b* and is connected with an output shaft of the right driving electric motor 432*b*, and the right driving gear 434*b* is mounted to an output of the right reduction gear mechanism 433*b*.

Referring to FIG. 8 in combination with FIGS. 17 to 22, the transverse link 450 is a hollow pipe, wherein a torsion spring 460 for fast restoration of the seat cushion skeleton assembly 200 is mounted in the transverse link 450.

The torsion spring 460 includes two torsion bars 461 and 462. On a pipe surface of the transverse link 450, in positions proximate to its left and right end, the transverse link 450 is recessed inward, and thus a left and a right countersunk portion 451*a*, 451*b* are formed, wherein the left and the right countersunk portion 451*a*, 451*b* may be formed on the pipe surface of the transverse link 450 by a pressing method. The torsion bar 461 is located within the transverse link 450, wherein a left end of the torsion bar 461 extends out of the transverse link 450 and is formed as a left outer hook 461*a* and is positioned by a left torsion spring centering plastic member 470*a*, and a right end of the torsion bar 461 is formed as a right inner hook 461*b* and engages the right countersunk portion 451*b* of the transverse link 450. The torsion bar 462 is located within the transverse link 450, wherein a left end of the torsion bar 462 is formed as a left inner hook 462*a* and engages the left countersunk portion 451*a* of the transverse link 450, and a right end of the torsion bar 462 extends out of the transverse link 450 and is formed as a right outer hook 462*b* and is positioned by a right torsion spring centering plastic member 470*b*.

The lower ends of the left and the right front link 440*a*, 440*b* are provided with a left and a right front link hook 442*a*, 442*b*, wherein the upper ends of the outer links 422*a*, 422*b* of the left and the right toothed plate link 420*a*, 420*b* are provided with a left and a right outer link hook 4224*a* and 4224*b*.

Figure 13:
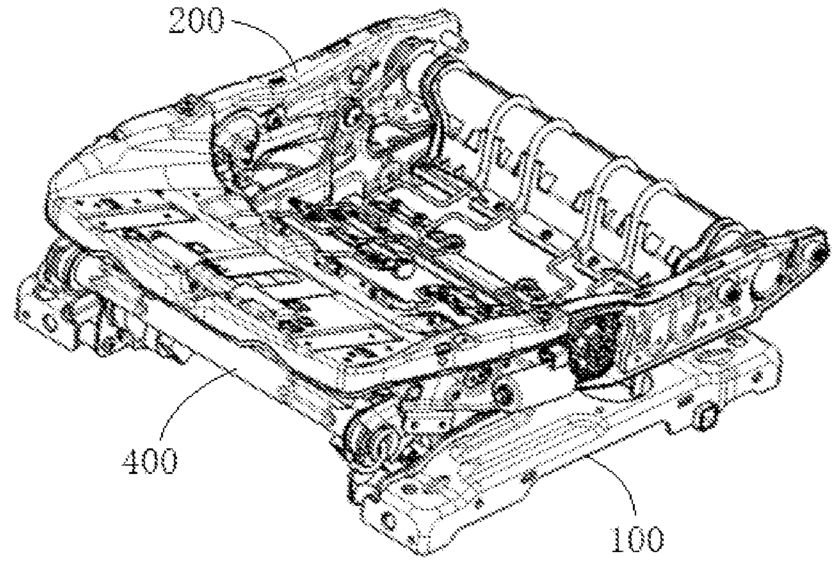
FIG. 13 is a schematic structural view of the seat tilt adjustment mechanism according to the first embodiment of the present invention when the cushion tilt angle is in the normal position.
Figure 14:
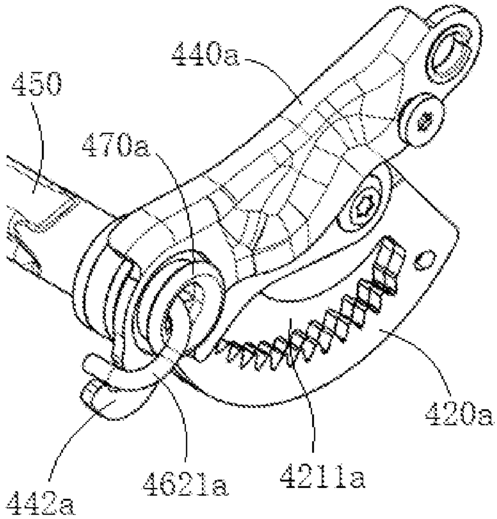
FIG. 14 is a partially enlarged schematic view illustrating the cooperation between a torsion spring and the left and the right front link as well as the left and the right toothed plate link in FIG. 13.

Referring to FIGS. 13 and 14, when the cushion tilt angle is in a normal position, the left outer hook 461*a* and the right outer hook 462*b* engage the left and the right front link hook 442*a*, 442*b* of the left and the right front link 440*a*, 440*b* respectively, so that the torsion spring 460 is in a pre-tightened state, wherein the left outer hook 461*a* and the right outer hook 462*b* are not in contact with the left and the right outer link hook 424*a*, 4224*b* of the left and the right toothed plate link 420*a*, 420*b*, thereby ensuring that the torsion spring 460 may be in a pre-tightened state in its whole stroke, and avoiding the problem of the abnormal noise caused by a free state of the torsion spring 460.

Figure 15:
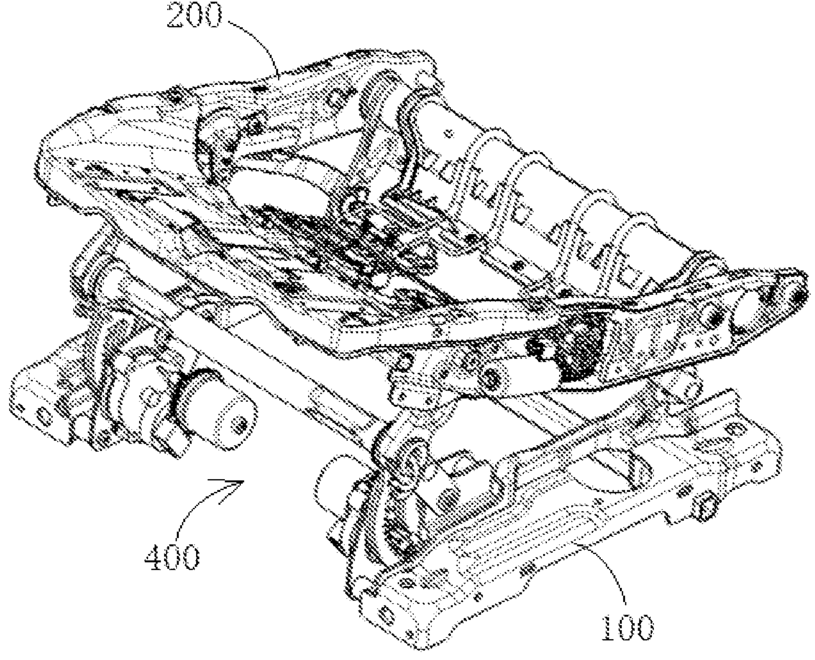
FIG. 15 is a schematic structural view of the seat tilt adjustment mechanism according to the first embodiment of the present invention when the cushion tilt angle is in an intermediate position.
Figure 16:
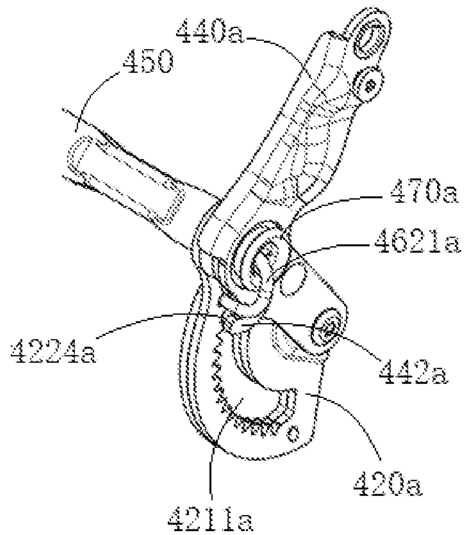
FIG. 16 is a partially enlarged schematic view illustrating the cooperation between the torsion spring and the left and the right front link as well as the left and the right toothed plate link in FIG. 15.

Referring to FIGS. 15 and 16, when the cushion tilt angle is switched from the normal position to an intermediate position, during a rotation process, the left and the right outer link hook 4224*a*, 4224*b* as well as the left and the right front link hook 442*a*, 442*b* are in contact with the left and the right outer hook 461*a*, 462*b* simultaneously, wherein a torsion force of the torsion spring 460 is unchanged.

Figure 17:
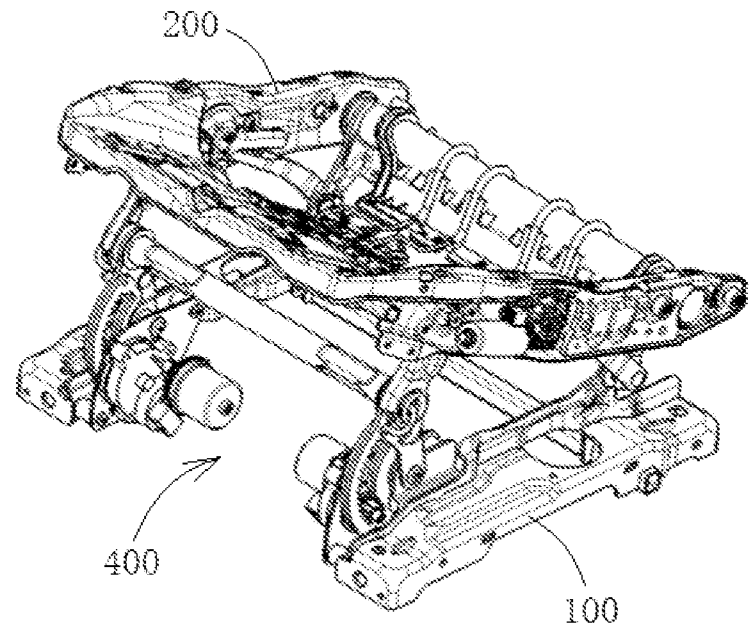
FIG. 17 is a schematic structural view of the seat tilt adjustment mechanism according to the first embodiment of the present invention when the cushion tilt angle is in the maximum position.
Figure 18:
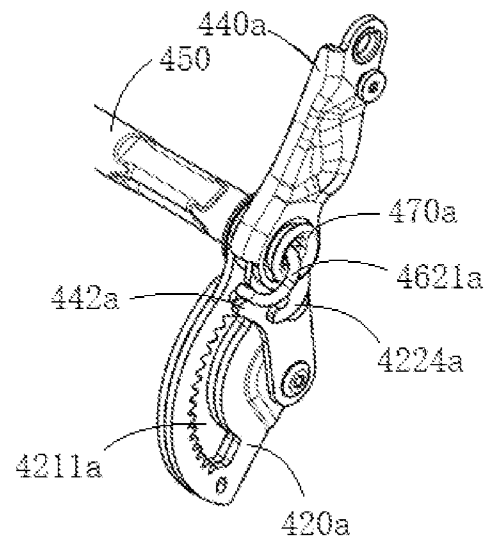
FIG. 18 is a partially enlarged schematic view illustrating the cooperation between the torsion spring and the left and the right front link as well as the left and the right toothed plate link in FIG. 17.

Referring to FIGS. 17 and 18, when the cushion tilt angle is switched from the intermediate position to a maximum position, during a rotation process, the left and the right outer link hook 4224*a*, 4224*b* engage the left and the right outer hook 461*a*, 462*b*, so that the left and the right outer hook 461*a*, 462*b* are disengaged from the left and the right front link hook 442*a*, 442*b* and thus the torsion spring 460 generates an enhanced torque. When the cushion tilt angle is switched from the maximum position to the normal position, the left outer hook 461*a* and the right outer hook 462*b* exert a rotation force on the left and the right outer link hook 4224*a*, 4224*b* under the action of the torsion force, so that the outer links 422*a*, 422*b* of the left and the right toothed plate link 420*a*, 420*b* rotate rapidly, so as to allow fast restoration of the seat cushion skeleton assembly.

On the transverse link 450, in positions proximate to its left and right end, a left and a right Y-direction limiting gasket 452*a*, 452*b* are provided for limiting the upper ends of the left and the right toothed plate link 420*a*, 420*b* in the Y direction.

Figure 19:
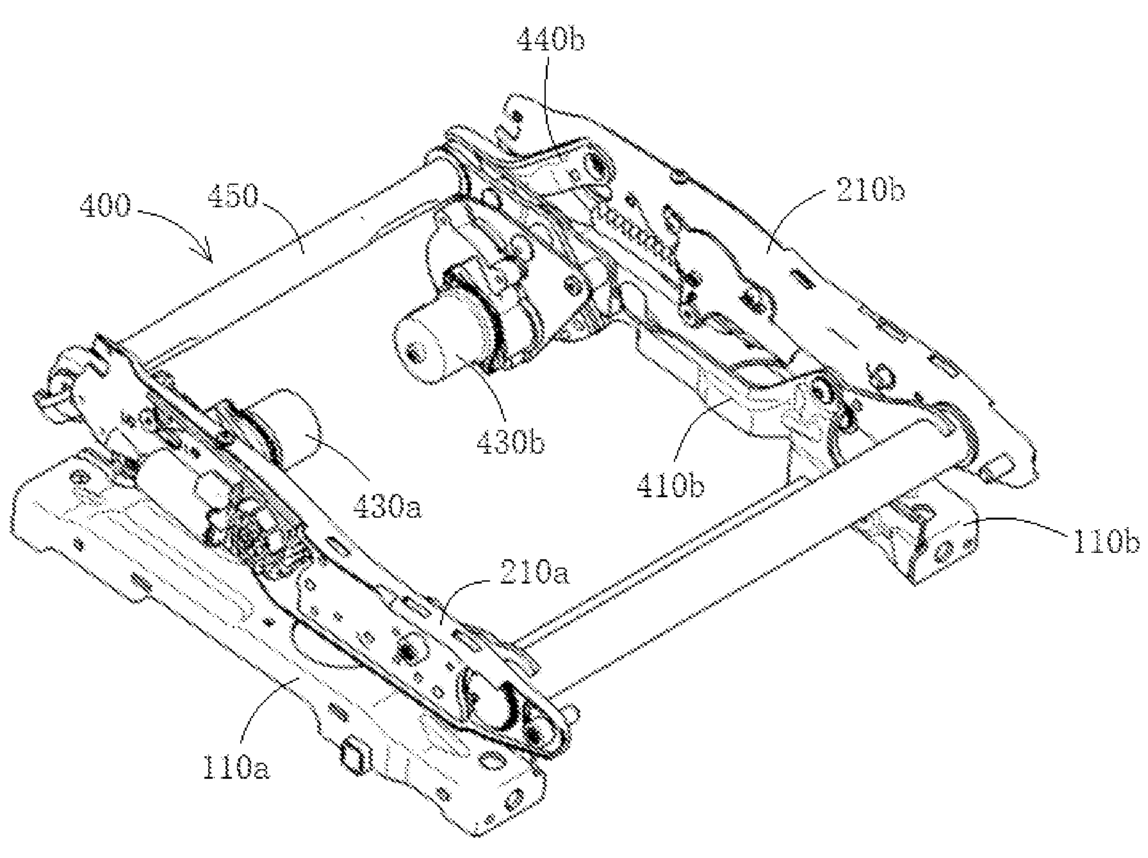
FIG. 19 is a three-dimensional schematic structural view of the seat tilt adjustment mechanism according to the first embodiment of the present invention when the cushion tilt angle is in the normal position.
Figure 20:
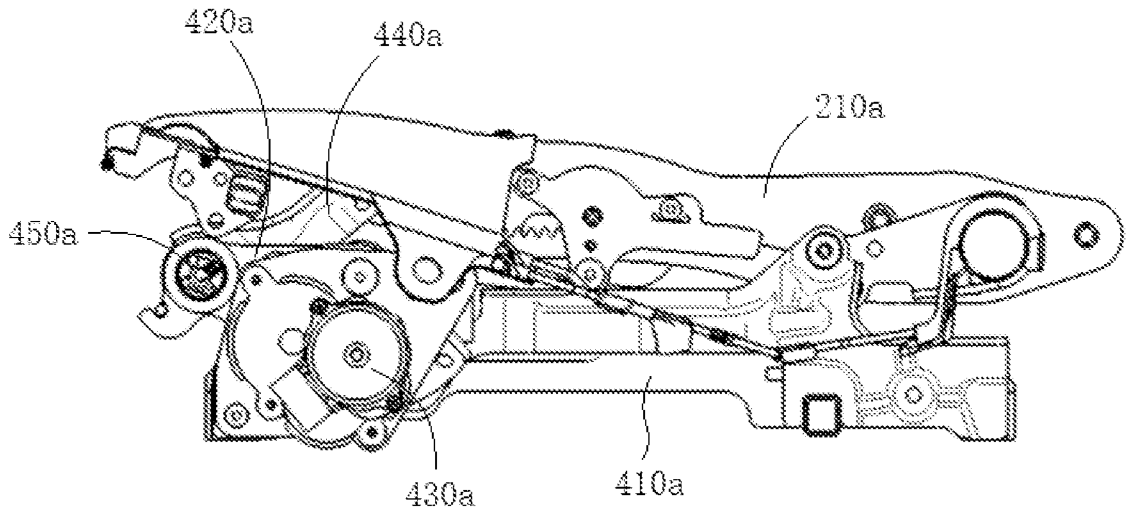
FIG. 20 is a side view of the seat tilt adjustment mechanism according to the first embodiment of the present invention when the cushion tilt angle is in the normal position.
Figures 21, 22:
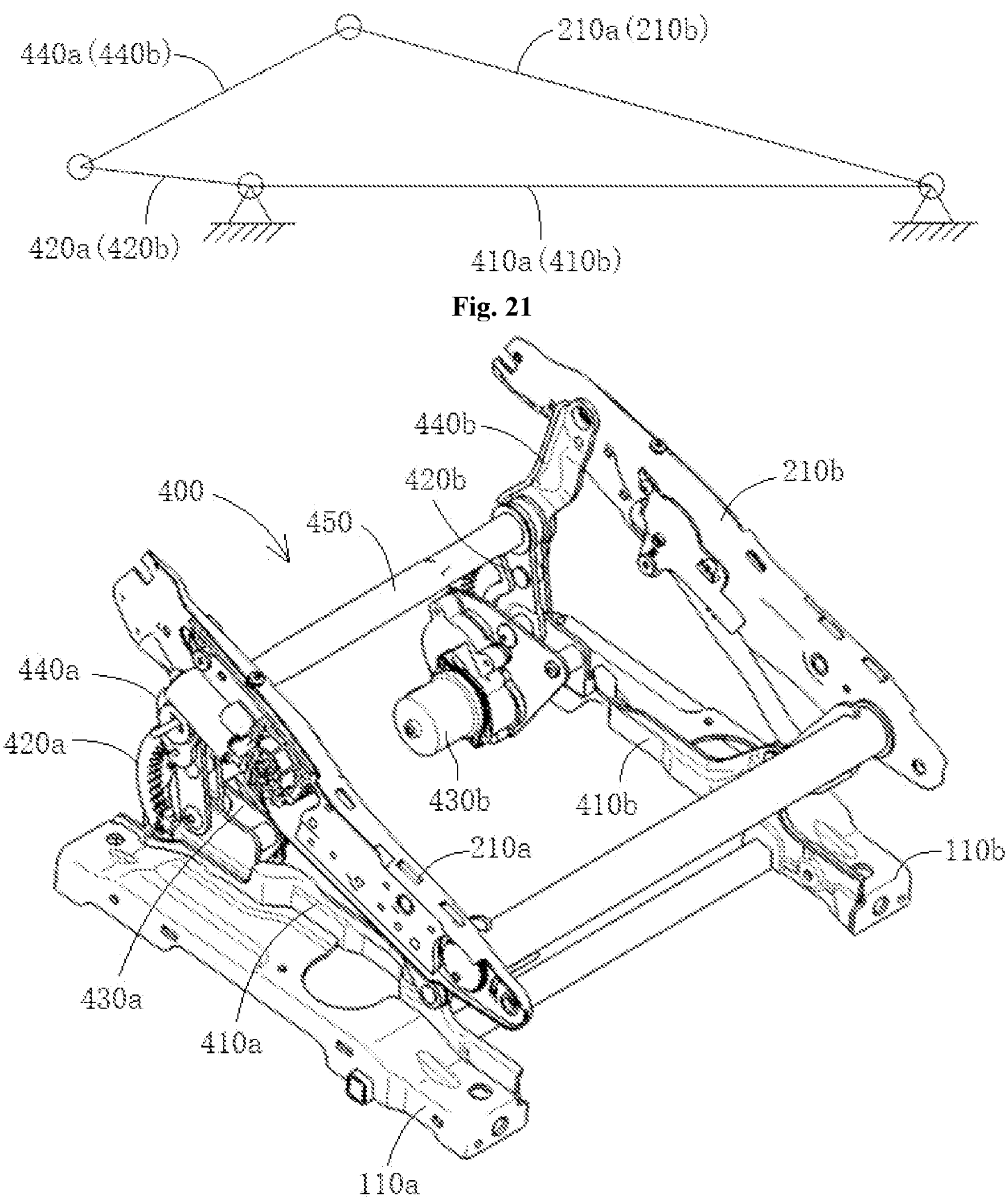
FIG. 21 is a simplified schematic view of the links of the seat tilt adjustment mechanism according to the first embodiment of the present invention when the cushion tilt angle is in the normal position.
FIG. 22 is a three-dimensional schematic structural view of the seat tilt adjustment mechanism according to the first embodiment of the present invention when the cushion tilt angle is in the maximum position.

An operation process of the seat tilt adjustment mechanism according to the first embodiment of the present invention may be as follows:

Referring to FIGS. 19 to 21, the seat tilt adjustment mechanism according to the first embodiment of the present invention is shown with the cushion tilt angle in the normal position.

Figures 23, 24:
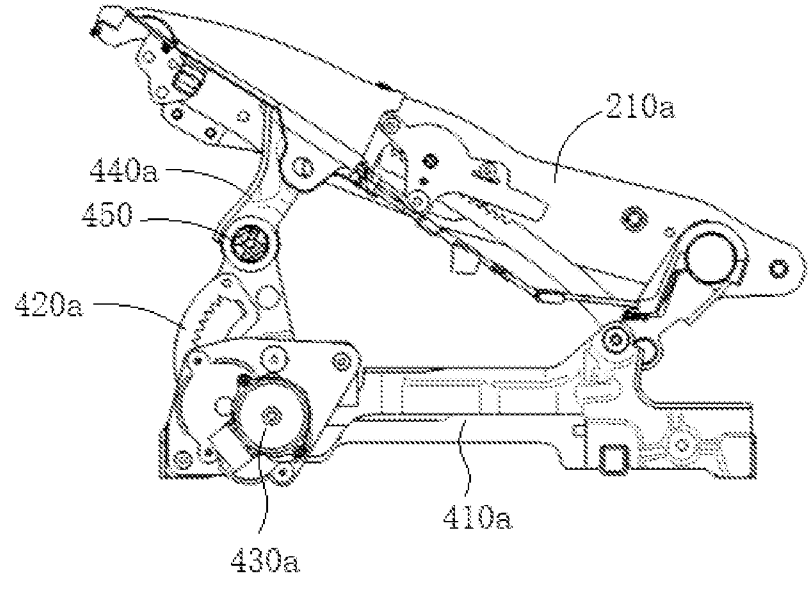
FIG. 23 is a side view of the seat tilt adjustment mechanism according to the first embodiment of the present invention when the cushion tilt angle is in the maximum position.
FIG. 24 is a simplified schematic view of the links of the seat tilt adjustment mechanism according to the first embodiment of the present invention when the cushion tilt angle is in the normal position.

Referring to FIGS. 22 to 24, the seat tilt adjustment mechanism according to the first embodiment of the present invention is shown with the cushion tilt angle switched from the normal position to the maximum position. In this process, the left and the right driving electric motor assembly 430*a*, 430*b* drive the left and the right driving gear 434*a*, 434*b* to rotate, so as to drive the left and the right toothed plate link 420*a*, 420*b* to rotate, and the left and the right toothed plate link 420*a*, 420*b* in turn drive the left and the right front link 440*a*, 440*b* to rotate by means of the transverse link 450, so that a front end of the seat cushion skeleton assembly 200 is lifted to increase the cushion tilt angle. A tilt angle of the seat backrest may be changed in the same degree as the cushion tilt angle, or in relation to the cushion tilt angle. Additionally, the tilt angle of the seat backrest may be also adjusted separately.

Now, a vehicle seat according to a second embodiment of the present invention is described with reference to FIGS. 25 to 39, which includes a seat tilt adjustment mechanism according to a second embodiment.

The seat tilt adjustment mechanism 400' in this embodiment is the same as the seat tilt adjustment mechanism 400 in the first embodiment in the operation principle. Specifically, referring to FIGS. 25 to 27, the seat tilt adjustment mechanism 400' in this embodiment includes a left and a right base link 410*a*', 410*b*', a left and a right tilt adjustment link 420*a*', 420*b*', a left and a right front link 430*a*', 430*b*', a transverse link 440' and a driving electric motor mechanism.

The left and the right base link 410*a*', 410*b*' are fixedly mounted to inner sides of the left and the right link 110*a*', 110*b*' of the seat frame assembly 100'.

The left and the right tilt adjustment link 420*a*', 420*b*' are rotatably arranged on front ends of the left and the right base link 410*a*', 410*b*'.

Upper ends of the left and the right front link 430*a*' and 430*b*' are hinged to front ends of the left and the right link 210*a*', 210*b*' of the seat cushion skeleton assembly 200'.

A left end of the transverse link 440' is rotatably connected with the left tilt adjustment link 420*a*' and a lower end of the left front link 430*a*', and a right end of the transverse link 440' is rotatably connected with an upper end of the right tilt adjustment link 420*b*' and a lower end of the right front link 430*b*'.

The driving electric motor mechanism drives the left tilt adjustment link 420*a*' and the right tilt adjustment link 420*b*' to rotate synchronously by means of a gear-rack structure, so as to adjust a cushion tilt angle. In this embodiment, referring to FIG. 28 to FIG. 29 in combination with FIG. 27, the driving electric motor mechanism includes a left and a right driving electric motor assembly 450*a*', 450*b*', which are fixedly mounted to inner sides of the left and the right tilt adjustment link 420*a*', 420*b*' through a left and a right electric motor fixing bolt 451*a*', 451*b*', so that their outputs pass through a left and a right shaft hole 421*a*', 421*b*' in the left and the right tilt adjustment link 420*a*', 420*b*' and are exposed on outer sides of the left and the right tilt adjustment link 420*a*', 420*b*'. The gear-rack structure includes a left and a right driving gear 460*a*', 460*b*', and a left and a right arc-shaped rack 470*a*', 470*b*', wherein the left and the right driving gear 460*a*', 460*b*' are fixedly mounted to the outputs of the left and the right driving electric motor assembly 450*a*', 450*b*'. First ends of the left and the right arc-shaped rack 470*a*', 470*b*' are hinged to the front ends of the left and the right base link 410*a*', 410*b*' through rack rotation bolts 471*a*', 471*b*' and are located on front sides of the left and the right tilt adjustment link 420*a*', 420*b*'. The left and the right arc-shaped rack 470*a*', 470*b*' and the left and the right driving gear 460*a*', 460*b*' are permanently kept in a meshed state through stop parts 480'. When the driving electric motor mechanism works, the left and the right driving electric motor assembly 450*a*', 450*b*' drive the left and the right driving gear 460*a*', 460*b*' to rotate, wherein a rotation angle of the left and the right tilt adjustment link 420*a*', 420*b*' is controlled under the guidance of the left and the right arc-shaped rack 470*a*' and 470*b*'.

Figure 25:
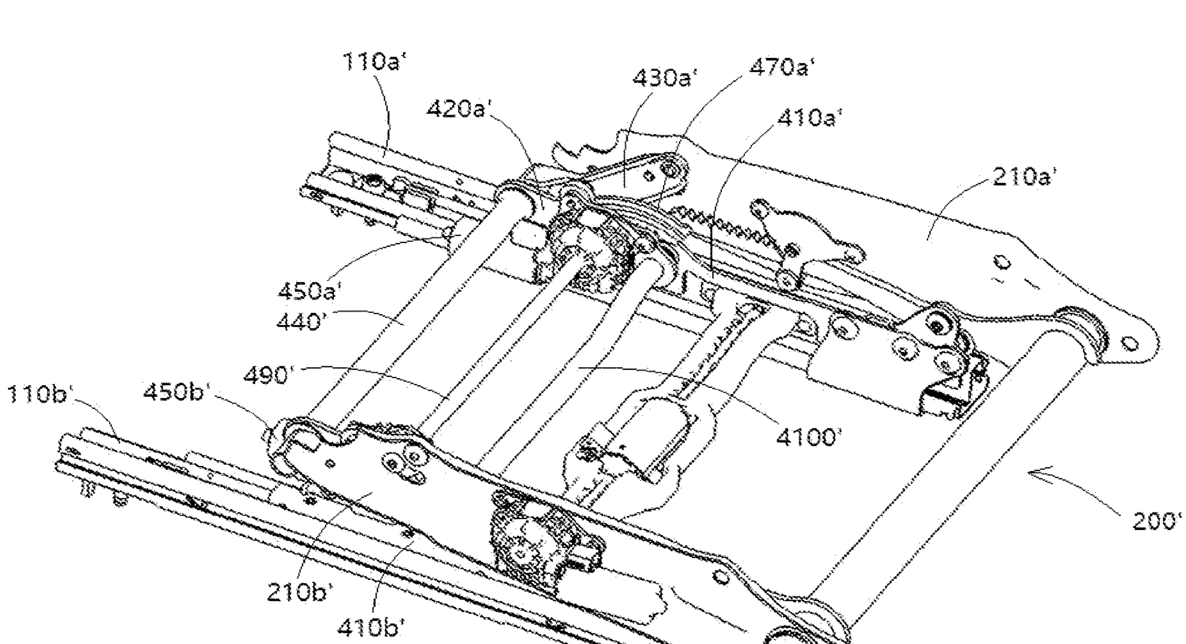
FIG. 25 is a three-dimensional schematic structural view of a seat tilt adjustment mechanism of a vehicle seat according to a second embodiment of the present invention when a tilt angle of a cushion is in a normal position.
Figure 26:
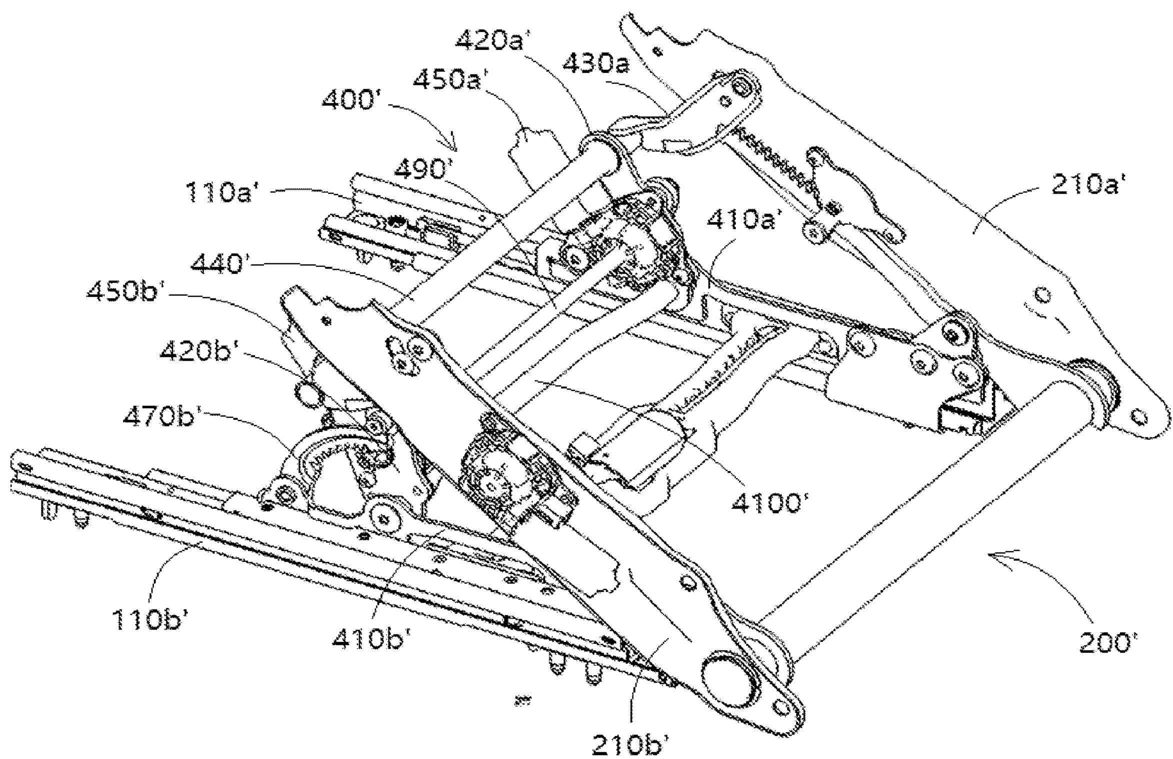
FIG. 26 is a three-dimensional schematic structural view of the seat tilt adjustment mechanism according to the second embodiment of the present invention when the cushion tilt angle is in a maximum position.
Figure 27:
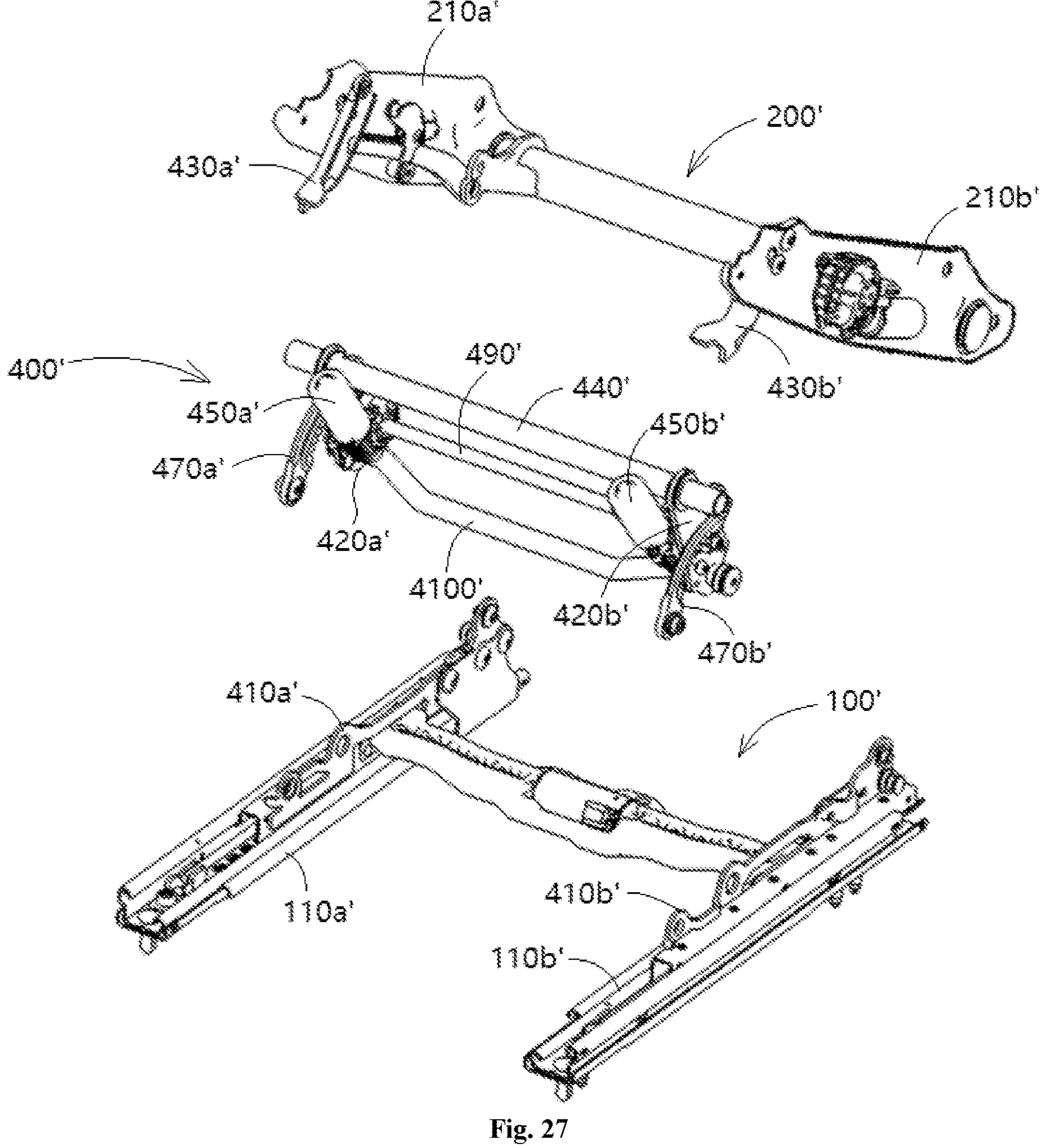
FIG. 27 is an exploded schematic structural view of the seat tilt adjustment mechanism according to the second embodiment of the present invention.
Figure 28:
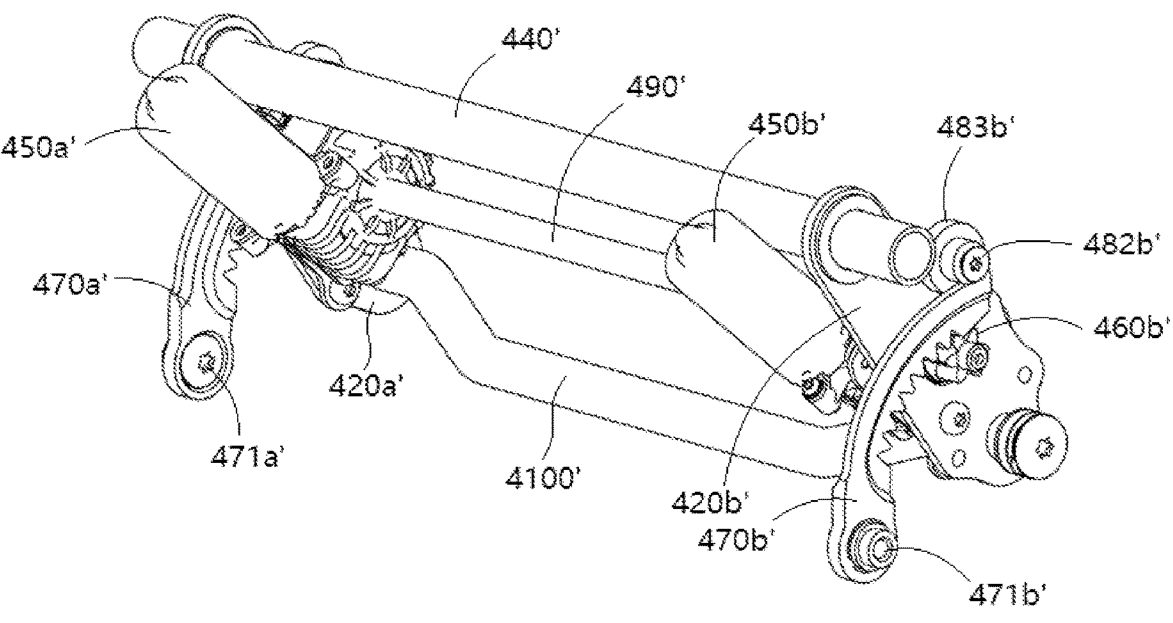
FIG. 28 is a schematic view illustrating the cooperation between a driving electric motor mechanism and a gear-rack structure of the seat tilt adjustment mechanism according to the second embodiment of the present invention.
Figure 29:
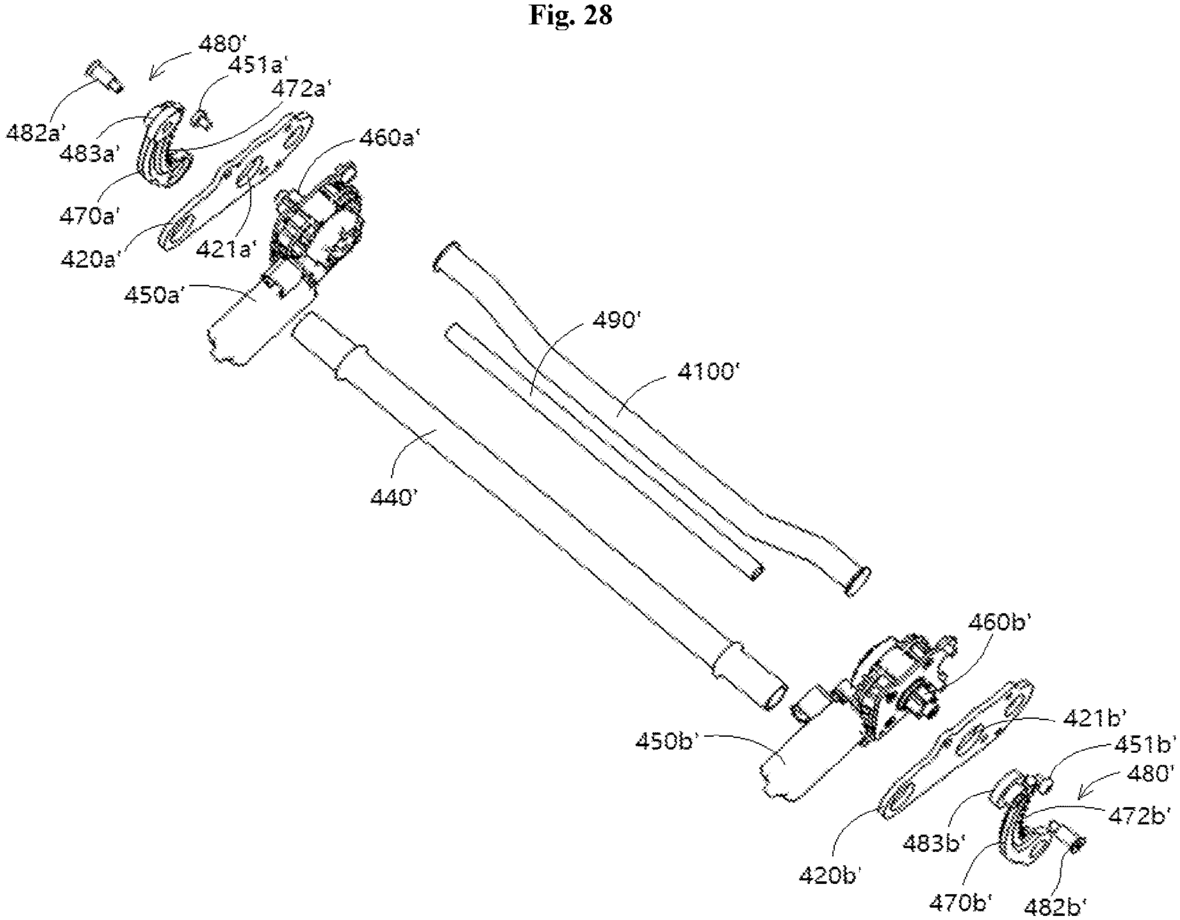
FIG. 29 is an exploded schematic structural view of FIG. 28.
Figures 30, 31:
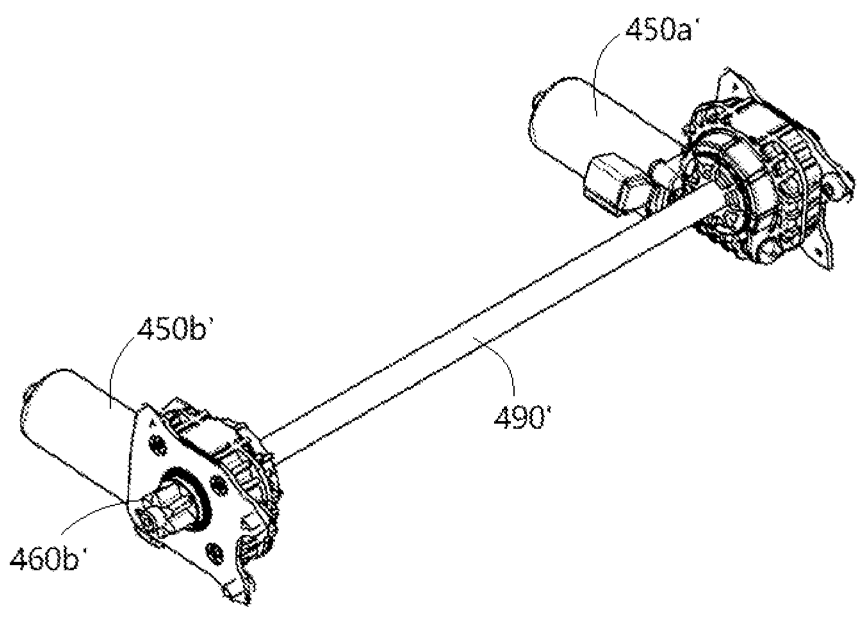
FIG. 30 is a schematic structural view of the driving electric motor mechanism of the seat tilt adjustment mechanism according to the second embodiment of the present invention.
FIG. 31 is a partially enlarged schematic view of an embodiment of a stop part for the gear-rack structure of the seat tilt adjustment mechanism according to the second embodiment of the present invention.

Referring to FIG. 30 in combination with FIGS. 25 and 26, the driving electric motor mechanism further includes a synchronizing rod 490' located between the left and the right driving electric motor assembly 450*a*', 450*b*'. A left and a right end of the synchronization rod penetrate into the left and the right driving electric motor assembly 450*a*', 450*b*' and are connected with outputs of the left and the right driving electric motor assembly 450*a*', 450*b*' to ensure the synchronization of the left and the right driving electric motor assembly 450*a*', 450*b*'. When there is a speed difference in the electric motors of the left and the right driving electric motor assembly 450*a*', 450*b*', the quick electric motor drives the slow electric motor through the synchronization rod 490', so that the lifting speeds of the front end of the seat cushion skeleton assembly 200' at two sides are balanced, thereby effectively preventing unsmooth movement caused by the speed difference of the electric motors at two sides.

The seat tilt adjustment mechanism 400' in this embodiment further includes a connection bent pipe 4100' located between the left and the right tilt adjustment link 420*a*', 420*b*', wherein a left and a right end of the connection bent pipe are connected to the inner sides of the left and the right tilt adjustment link 420*a*', 420*b*' so as to ensure synchronous tilting of the left and the right tilt adjustment link 420*a*', 420*b*'.

Referring to FIG. 31, the stop parts 480' include a left and a right stop bolt 481*a*', 481*b*' mounted to the outer sides of the left and the right tilt adjustment link 420*a*', 420*b*', wherein a left and a right rack limiting gap are formed between the left and the right stop bolt 481*a*', 481*b*' and the left and the right driving gear 460*a*', 460*b*', wherein the left and the right arc-shaped rack 470*a*', 470*b*' are permanently located in the left and the right rack limiting gap during the rotation process, so that the left and the right driving gear 460*a*', 460*b*' are permanently meshed with teeth 472*a*', 472*b*' formed on inner arc surfaces of the left and the right arc-shaped rack 470*a*', 470*b*'. In this solution, a backlash bushing isn't necessary, wherein the gaps between the left and the right driving gear 460*a*', 460*b*' and the left and the right arc-shaped rack 470*a*', 470*b*' are eliminated by an appropriate diameter of the left and the right stop bolt 481*a*', 481*b*', which may avoid the potential occurrence of the abnormal noise.

Figure 32:
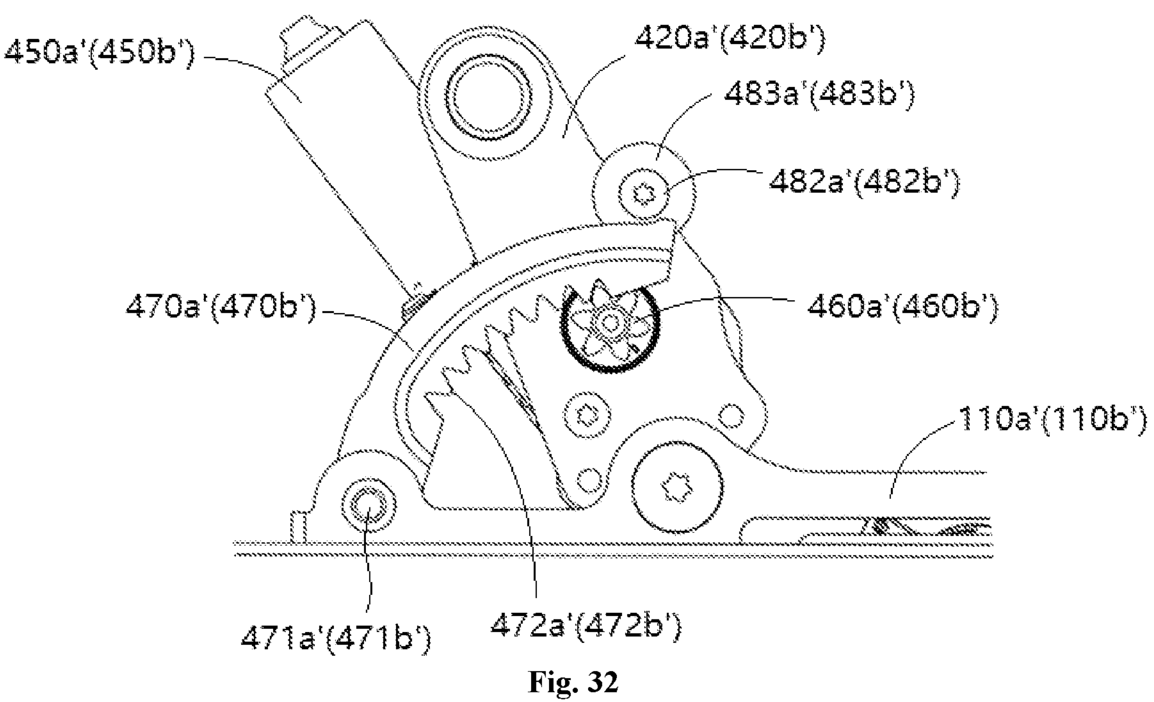
FIG. 32 is a partially enlarged schematic view of another embodiment of a stop part for the gear-rack structure of the seat tilt adjustment mechanism according to the second embodiment of the present invention.
Figure 33:
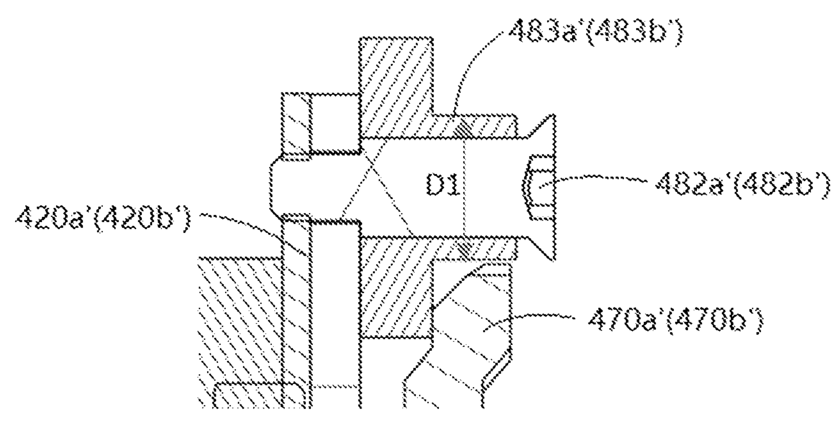
FIG. 33 is a cross-sectional view in a region of the stop part of FIG. 32.

Referring to FIGS. 32 and 33, another form of stop parts 480' is shown. The stop parts 480' includes a left and a right stop bolt 482*a*', 482*b*' and a left and a right backlash bushing 483*a*', 483*b*'. The left and the right backlash bushing 483*a*', 483*b*' are fixedly mounted to the outer sides of the left and the right tilt adjustment link 420*a*', 420*b*' through the left and the right stop bolt 482*a*', 482*b*', wherein a left and a right rack limiting gap are formed between the left and the right backlash bushing 483*a*', 483*b*' and the left and the right driving gear 460*a*', 460*b*', wherein the left and the right arc-shaped rack 470*a*', 470*b*' are permanently located in the left and the right rack limiting gap during the rotation process, so that the left and the right driving gear 460*a*', 460*b*' are permanently meshed with teeth 472*a*', 472*b*' formed on inner arc surfaces of the left and the right arc-shaped rack 470*a*', 470*b*'. In this solution, the gaps between the left and the right driving gear 460*a*', 460*b*' and the left and the right arc-shaped rack 470*a*', 470*b*' are eliminated by an appropriate diameter of the left and the right backlash bushing 483*a*', 483*b*'. This solution is more convenient for installation and saves the cost, which avoids the potential occurrence of the abnormal noise. In this solution, the left and the right backlash bushing 483*a*' and 483*b*' may be small bushings with a small bushing diameter D1, and are suitable for eliminating large gaps.

Figures 34, 35, 36:
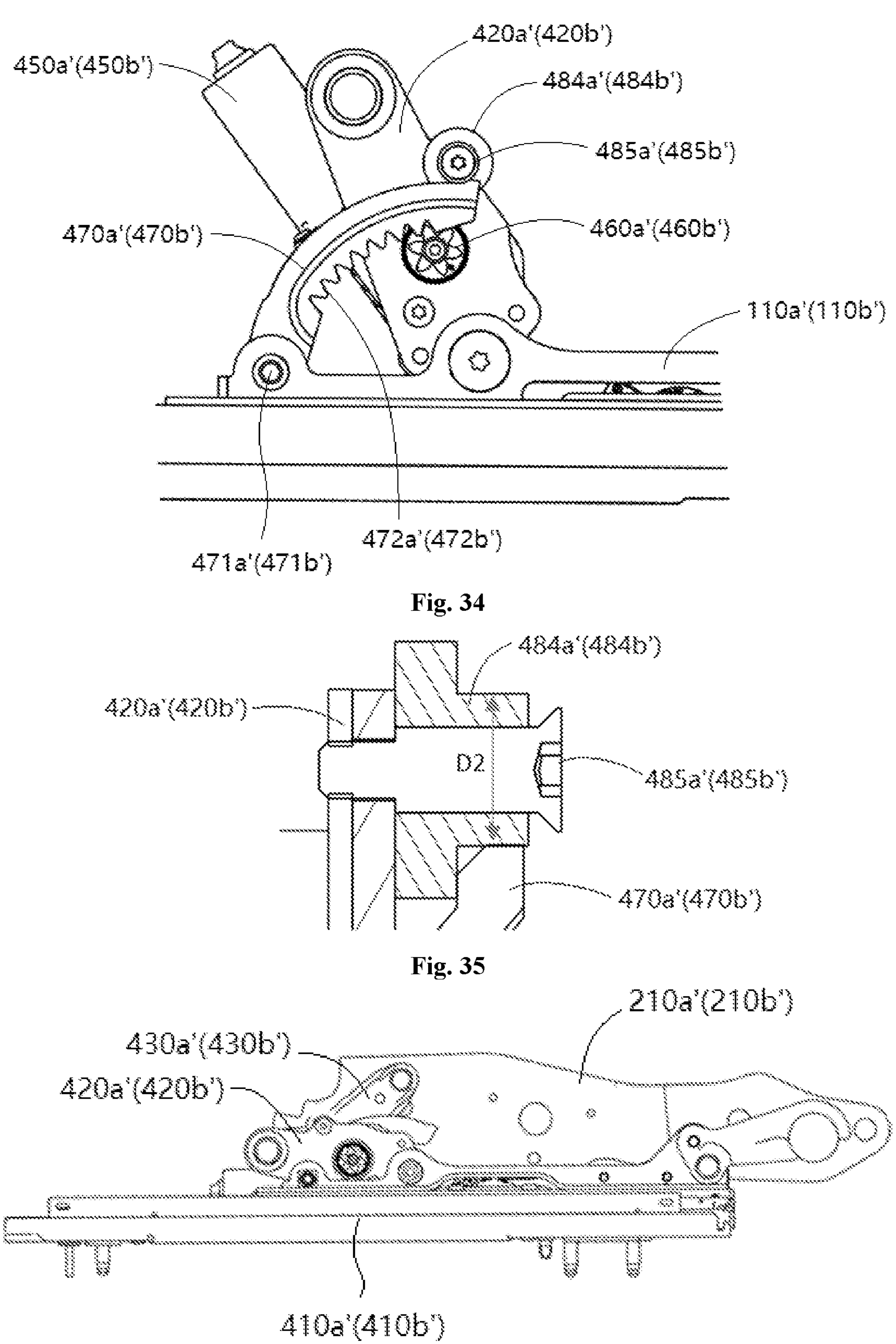
FIG. 34 is a partially enlarged schematic view of another embodiment of a stop part for the gear-rack structure of the seat tilt adjustment mechanism according to the second embodiment of the present invention.
FIG. 35 is a sectional view of the stop part of FIG. 34.
FIG. 36 is a side view of the seat tilt adjustment mechanism according to the second embodiment of the present invention when the cushion tilt angle is in the normal position.

In addition, refer to FIGS. 34 and 35, another form of stop parts is shown. In this solution, the left and the right backlash bushing 484*a*', 484*b*' are mounted by means of the left and the right stop bolt 485*a*', 485*b*'. Here, large bushings are used, wherein the bushing diameter D2 is large, which is suitable for eliminating small gaps.

Referring to FIGS. 36 to 39, the seat tilt adjustment mechanism 400' in this embodiment is shown with the cushion tilt angle switched from the normal position to the maximum position. In this process, the left and the right driving electric motor assembly 450*a*', 450*b*' drive the left and the right driving gear 460*a*', 460*b*' to rotate, so as to drive the left and the right tilt adjustment link 420*a*', 420*b*' to rotate under the guidance of the left and the right arc-shaped rack 470*a*', 470*b*', and the left and the right toothed plate link 420*a*', 420*b*' in turn drive the left and the right front link 430*a*', 430*b*' to rotate by means of the transverse link 440', so that a front end of the seat cushion skeleton assembly is lifted to increase the cushion tilt angle. In addition, a lifting stroke may be adjusted exclusively by adjusting an extension length of the left and the right arc-shaped rack 470*a*', 470*b*', which allows a simpler structure of the seat tilt adjustment mechanism and less occupied space.

The basic principles and the main features of the present invention as well as the advantages of the present invention have been shown and described above. It should be understood by those skilled in the art that, the present invention is not limited to the above-described embodiments, and what is described in the above-described embodiments and this specification only serves to explain the principles of the present invention. Various modifications and improvements may be carried out without departing from the spirit and scope of the present invention, and fall within the scope of the claims. The protection scope of the invention is defined by the following claims and equivalents thereof.

The invention claimed is:

1. A seat tilt adjustment mechanism, characterized in that, the seat tilt adjustment mechanism comprises:

a left and a right base link fixedly mounted to a left and a right link of a seat frame assembly;

a left and a right tilt adjustment link, wherein lower ends of the left and the right tilt adjustment link are hinged to front ends of the left and the right base link;

a left and a right front link, wherein upper ends of the left and the right front link are hinged to front ends of a left and a right link of a seat cushion skeleton assembly;

a transverse link, wherein a left end of the transverse link forms a rotary connection with an upper end of the left tilt adjustment link and a lower end of the left front link respectively, and a right end of the transverse link forms a rotary connection with an upper end of the right tilt adjustment link and a lower end of the right front link respectively; and a driving electric motor mechanism, wherein the driving electric motor mechanism can, by means of a gear-rack structure, drive the left and the right tilt adjustment link to rotate synchronously, so as to adjust a cushion tilt angle;

wherein the transverse link is a hollow pipe, wherein a torsion spring that biases the seat cushion skeleton assembly is mounted in the transverse link; and wherein the torsion spring includes a first and a second torsion bar, wherein a left end of the first torsion bar extends out of the transverse link and a right end of the first torsion bar is held by the transverse link, wherein a right end of the second torsion bar extends out of the transverse link and a left end of the second torsion bar is held by the transverse link, wherein the left end of the first torsion bar and the right end of the second torsion bar is operatable by the left and the right front link and/or the left and the right tilt adjustment link when the cushion tilt angle is increased, so that the first and the second torsion bar are tightened.

2. The seat tilt adjustment mechanism as recited in claim 1, characterized in that, the gear-rack structure includes a left and a right driving gear and a left and a right arc-shaped rack which are meshed with each other, wherein ones of the left and the right driving gear and the left and the right arc-shaped rack are arranged on the left and the right tilt adjustment link, and the others of the left and the right driving gear and the left and the right arc-shaped rack are arranged on the left and the right base link.

3. The seat tilt adjustment mechanism as recited in claim 2, characterized in that, the driving electric motor mechanism includes a left and a right driving electric motor fixedly mounted to inner sides of the left and the right base link, wherein the left and the right driving gear are fixedly mounted to outputs of the left and the right driving electric motors, and wherein the left and the right arc-shaped rack are integrated in the left and the right tilt adjustment link.

4. The seat tilt adjustment mechanism as recited in claim 3, characterized in that, the left and the right tilt adjustment link are configured as a left and a right toothed plate link which have a left and a right arc-shaped toothed elongated hole, wherein the left and the right driving gear are located in the left and the right arc-shaped toothed elongated hole of the left and the right toothed plate link and are meshed with the left and the right arc-shaped toothed elongated hole, wherein the left and the right driving gear are driven to rotate by the left and the right driving electric motors, wherein a rotation angle of the left and the right toothed plate link is controlled by the left and the right toothed plate link being guided by the left and the right arc-shaped toothed elongated hole.

5. The seat tilt adjustment mechanism as recited in claim 4, characterized in that, both the left and the right toothed plate link include:

an inner link having the left or the right arc-shaped toothed elongated hole, wherein an upper end of the inner link is provided with an inner rotation through hole to be sleeved on a left end or a right end of the transverse link, wherein a first mounting hole is provided at one side of the left or the right arc-shaped toothed elongated hole of the inner link; and an outer link fixedly arranged on an outer side of the inner link, wherein a gap is formed between the inner link and the outer link, wherein an upper end of the outer link is provided with an outer rotation through hole, which is coaxial with the inner rotation through hole and is configured to be sleeved on the left or the right end of the transverse link, wherein a lower end of the outer link is provided with a second mounting hole coaxial with the first mounting hole;

wherein the front end of the left or the right base link is provided with a base through hole;

wherein the front end of the left or the right base link enters the gap formed between the inner link and the outer link, wherein the first mounting hole, the second mounting hole and the base through hole are arranged coaxially, wherein a rotation shaft passes through the first mounting hole, the base through hole and the second mounting hole, so that the left or the right toothed plate link is rotatable relative to the left or the right base link around the rotation shaft.

6. The seat tilt adjustment mechanism as recited in claim 5, characterized in that, the first mounting hole is a connection screw hole, the second mounting hole is a connection through hole, and the rotation shaft is a first step bolt which sequentially passes through the connection through hole, the base through hole and the connection screw hole and is screwed in the connection screw hole, so that the left or the right toothed plate link is rotatable relative to the left or the right base link around the first step bolt.

7. The seat tilt adjustment mechanism as recited in claim 6, characterized in that, the left and the right toothed plate link further include a connection nut respectively, which is fixedly welded on an inner side of the inner link and is coaxial with the connection screw hole, wherein the connection nut is formed with an accommodating chamber for accommodating a front end of the first step bolt, an inner side of the connection nut abuts against an electric motor mounting plate of the left or the right driving electric motors, wherein a second step bolt passes through a through hole in the electric motor mounting plate and is screwed into the connection nut, so that the left or the right toothed plate link is rotatable relative to the electric motor mounting plate around the second step bolt.

8. The seat tilt adjustment mechanism as recited in claim 5, characterized in that, the left and the right toothed plate link further include a second bushing and a first Y-direction washer respectively, wherein the second bushing is sleeved on the left or the right end of the transverse link, wherein an inner and an outer end of the second bushing protrude from the inner rotation through hole of the inner link and the outer rotation through hole of the outer link, wherein the inner and the outer end of the second bushing are formed with an inner and an outer radial flange protruding outward, wherein the Y-direction washer is sleeved on the second bushing and is located between the inner link and the outer link.

9. The seat tilt adjustment mechanism as recited in claim 5, characterized in that, the left and the right toothed plate link further include a connection rivet and a second Y-direction washer respectively, wherein an inner and an outer end of the connection rivet pass through an inner rivet through hole provided in the inner link and an outer rivet through hole provided in the outer link, wherein the connection rivet is squeezed into a rivet connection, wherein the second Y-direction washer is sleeved on the connection rivet and is located between the inner link and the outer link.

10. The seat tilt adjustment mechanism as recited in claim 5, characterized in that, the left and the right toothed plate link further include a reinforcing toothed plate respectively, which is fixedly mounted to an inner side of the inner link and is formed with a reinforcing arc-shaped toothed elongated hole which is configured identically to the left or the right arc-shaped toothed elongated hole.

11. The seat tilt adjustment mechanism as recited in claim 5, characterized in that, the transverse link is a hollow pipe, wherein the torsion torsion spring is mounted in the transverse link, wherein a left and a right countersunk portion are formed by recession inwards on a pipe surface of the transverse link in positions proximate to the left and the right ends of the transverse link;

wherein the first torsion bar is located in the transverse link, wherein a left end of the first torsion bar extends out of the transverse link and is formed as a left outer hook and is positioned by a left torsion spring centering plastic member, and a right end of the first torsion bar is formed as a right inner hook and engages the right countersunk portion of the transverse link;

wherein the second torsion bar is located in the transverse link, wherein a left end of the second torsion bar is formed as a left inner hook and engages the left countersunk portion of the transverse link, and a right end of the second torsion bar extends out of the transverse link and is formed as a right outer hook and is positioned by a right torsion spring centering plastic member;

wherein the lower ends of the left and the right front link are provided with a left and a right front link hook, and the upper ends of the outer links of the left and the right toothed plate link are provided with a left and a right outer link hook;

when the cushion tilt angle is in a first position, the left outer hook of the first torsion bar and the right outer hook of the second torsion bar engage the left and the right front link hook of the left and the right front link respectively, so that the torsion spring is in a pre-tightened state, wherein the left outer hook of the first torsion bar and the right outer hook of the second torsion bar are not in contact with the left and the right outer link hook of the outer links of the left and the right toothed plate link;

when the cushion tilt angle is switched from the normal position to a maximum position, the left and the right outer link hook engage the left outer hook of the first torsion bar and the right outer hook of the second torsion bar during a rotation process, so that the left outer hook of the first torsion bar and the right outer hook of the second torsion bar are disengaged from the left and the right front link hook, so that the torsion spring generates an enhanced torque;

when the cushion tilt angle is switched from the maximum position to the normal position, the left outer hook of the first torsion bar and the right outer hook of the second torsion bar exert a rotation force on the left and the right outer link hook under the action of a torsion force, so that the outer links of the left and the right toothed plate link rotate to allow restoration of the seat cushion skeleton assembly.

12. A vehicle seat, comprising a seat frame assembly, a seat cushion skeleton assembly, a seat cushion assembly and a tilt adjustment mechanism, wherein the seat cushion skeleton assembly is mounted to the seat frame assembly, the seat cushion assembly covers the seat cushion skeleton assembly, and the tilt adjustment mechanism is arranged between the seat frame assembly and the seat cushion skeleton assembly for adjusting a tilt angle of the seat cushion skeleton assembly relative to the seat frame assembly, characterized in that, the tilt adjustment mechanism is the seat tilt adjustment mechanism as recited in claim 1.

13. A seat tilt adjustment mechanism, characterized in that, the seat tilt adjustment mechanism comprises:

a left and a right base link fixedly mounted to a left and a right link of a seat frame assembly;

a left and a right tilt adjustment link, wherein lower ends of the left and the right tilt adjustment link are hinged to front ends of the left and the right base link;

a left and a right front link, wherein upper ends of the left and the right front link are hinged to front ends of a left and a right link of a seat cushion skeleton assembly;

a transverse link, wherein a left end of the transverse link forms a rotary connection with an upper end of the left tilt adjustment link and a lower end of the left front link respectively, and a right end of the transverse link forms a rotary connection with an upper end of the right tilt adjustment link and a lower end of the right front link respectively; and a driving electric motor mechanism, wherein the driving electric motor mechanism can, by means of a gear-rack structure, drive the left and the right tilt adjustment link to rotate synchronously, so as to adjust a cushion tilt angle;

wherein the driving electric motor mechanism includes a left and a right driving electric motor fixedly mounted to inner sides of the left and the right tilt adjustment link, wherein outputs of the left and the right driving electric motors pass through a left and a right shaft hole in the left and the right tilt adjustment link and are exposed on outer sides of the left and the right tilt adjustment link;

wherein the gear-rack structure includes a left and a right driving gear and a left and a right arc-shaped rack, wherein the left and the right driving gear are fixedly mounted to the outputs of the left and the right driving electric motor assembly, wherein first ends of the left and the right arc-shaped rack are hinged to the front ends of the left and the right base link and are located on front sides of the left and the right tilt adjustment link, wherein the left and the right arc-shaped rack and the left and the right driving gear are permanently kept in a meshed state through stop parts, wherein the left and the right driving gear are driven to rotate by the left and the right driving electric motors wherein a rotation angle of the left and the right tilt adjustment link is controlled by the left and the right driving gear being guided by the left and the right arc-shaped rack.

14. The seat tilt adjustment mechanism as recited in claim 13, characterized in that, the driving electric motor mechanism further includes a synchronizing rod located between the left and the right driving electric motors, wherein a left and a right end of the synchronizing rod penetrate into the left and the right driving electric motors and are connected with outputs of the left and the right driving electric motors to ensure the synchronization of the left and the right driving electric motors.

15. The seat tilt adjustment mechanism as recited in claim 13, characterized in that, the seat tilt adjustment mechanism further includes a connection bent pipe located between the left and the right tilt adjustment link, wherein a left and a right end of the connection bent pipe are connected to inner sides of the left and the right tilt adjustment link.

16. The seat tilt adjustment mechanism as recited in claim 13, characterized in that, the stop parts are arranged on the left and the right tilt adjustment link, wherein a left and a right rack limiting gap are formed between the stop parts and the left and the right driving gear.

17. The seat tilt adjustment mechanism as recited in claim 13, characterized in that, the stop parts include a left and a right stop bolt mounted to outer sides of the left and the right tilt adjustment link, wherein a left and a right rack limiting gap are formed between the left and the right stop bolt and the left and the right driving gear, wherein the left and the right arc-shaped rack are permanently located in the left and the right rack limiting gap during a rotation process, so that the left and the right driving gear are permanently meshed with teeth formed on inner arc surfaces of the left and the right arc-shaped rack.

18. The seat tilt adjustment mechanism as recited in claim 13, characterized in that, the stop parts include a left and a right stop bolt and a left and a right backlash bushing, wherein the left and the right backlash bushing are fixedly mounted to outer sides of the left and the right tilt adjustment link through the left and the right stop bolt, wherein a left and a right rack limiting gap are formed between the left and the right backlash bushing and the left and the right driving gear, wherein the left and the right arc-shaped rack are permanently located in the left and the right rack limiting gap during a rotation process, so that the left and the right driving gear are permanently meshed with teeth formed on inner arc surfaces of the left and the right arc-shaped rack.

19. A vehicle seat, comprising a seat frame assembly, a seat cushion skeleton assembly, a seat cushion assembly and a tilt adjustment mechanism, wherein the seat cushion skeleton assembly is mounted to the seat frame assembly, the seat cushion assembly covers the seat cushion skeleton assembly, and the tilt adjustment mechanism is arranged between the seat frame assembly and the seat cushion skeleton assembly for adjusting a tilt angle of the seat cushion skeleton assembly relative to the seat frame assembly, characterized in that, the tilt adjustment mechanism is the seat tilt adjustment mechanism as recited in claim 13.

* * * * *